United States Patent [19]

Kaiju et al.

[11] Patent Number: 4,894,999
[45] Date of Patent: Jan. 23, 1990

[54] AUTOMATIC AIR CONDITIONING SYSTEM WITH VARIABLE DISPLACEMENT COMPRESSOR, FOR AUTOMOTIVE VEHICLES

[75] Inventors: Masaki Kaiju; Toshimitsu Nose; Hideyuki Sakamoto; Ikuo Kiminami, all of Kanagawa, Japan

[73] Assignee: Nissan Motor Company, Limited, Japan

[21] Appl. No.: 330,550

[22] Filed: Mar. 30, 1989

[30] Foreign Application Priority Data

Mar. 31, 1988 [JP] Japan .................. 63-81995

[51] Int. Cl.$^4$ .............................................. F25B 1/00
[52] U.S. Cl. ....................................... 62/158; 62/161; 62/227; 62/228.5
[58] Field of Search ............... 62/158, 161 X, 209, 62/227 X, 228.5

[56] References Cited

U.S. PATENT DOCUMENTS 4,748,819 6/1988 Takahashi ...................... 62/227 X
4,815,300 3/1989 Suzuh .............................. 62/227 X Primary Examiner—William E. Wayner
Attorney, Agent, or Firm—Lowe, Price, LeBlanc, Becker & Shur

[57] ABSTRACT

An automatic air conditioning system for automotive vehicles with a variable displacement compressor comprises a sensor for detecting an intake air temperature of air flowing through the evaporator placed just behind the evaporator, a control valve for the compressor essentially changing the discharge of said compressor on the basis of the difference between the intake air temperature and its target value, and a CPU for changing the target value of the intake air temperature. When the CPU does not receive a signal indicative of a requirement for quick-cooling, the target value is set to a freezing start possible temperature defined by an intake air temperature such that the freezing of the evaporator starts, and when the CPU receives the signal indicative of a requirement for quick-cooling, the target value is set to a predetermined temperature lower than the freezing start possible temperature. Thus, the automatic air conditioning system is capable of maintaining a high displacement of refrigerant in spite of the lowering of suction pressure of the compressor, related to the dropping of the intake air temperature, when the quick-cooling is required.

32 Claims, 13 Drawing Sheets

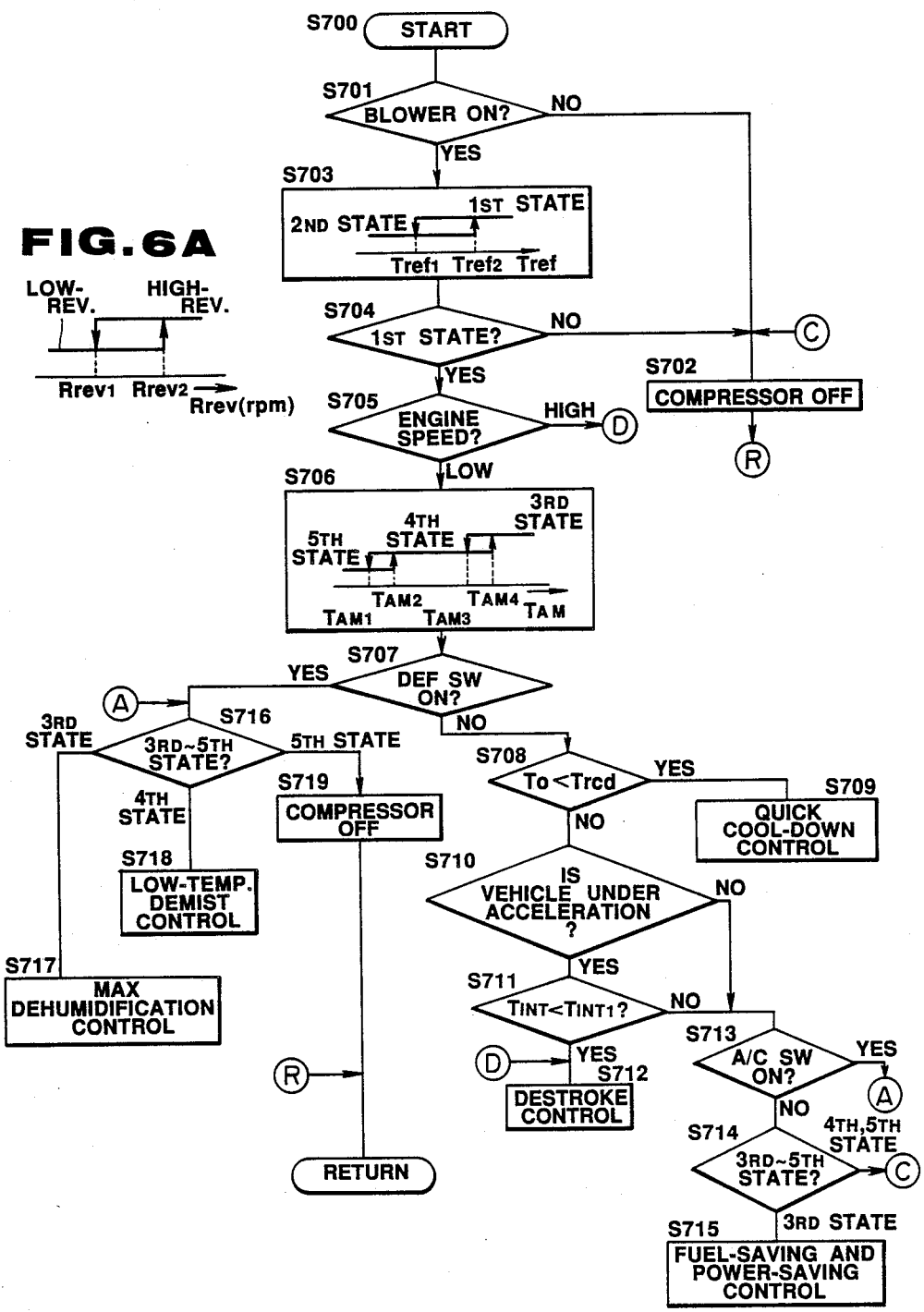

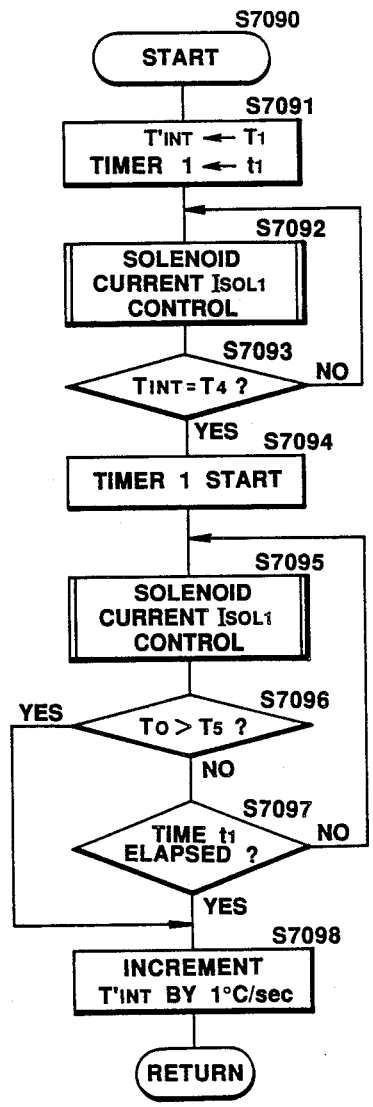
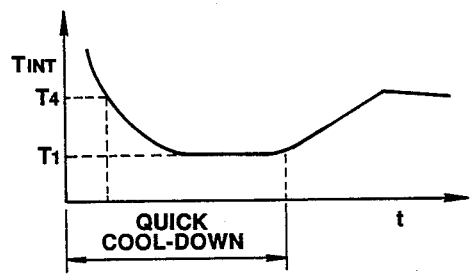

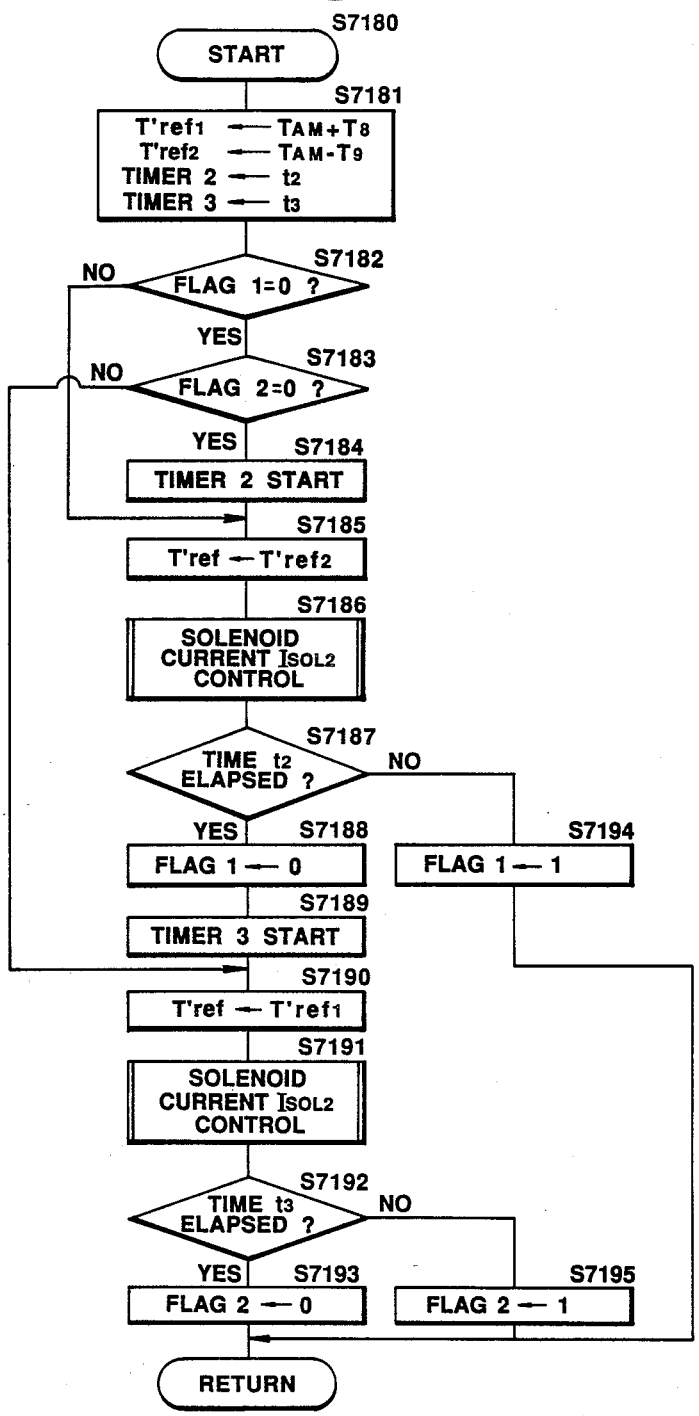

AUTOMATIC AIR CONDITIONING SYSTEM WITH VARIABLE DISPLACEMENT COMPRESSOR, FOR AUTOMOTIVE VEHICLES

BACKGROUND OF THE INVENTION

1. Field of the Invention

The present invention relates to an automatic air conditioning system with a variable displacement compressor, for automotive vehicles, particularly to a system which is capable of maintaining a high displacement of refrigerant therein when quick cooling is required; for example, during summer days in which the ambient temperature is particularly high. High displacement, optimum cooling power, must be maintained even though the suction pressure of the compressor is lowered in response to a decrease in the intake air temperature (as measured just behind the evaporator of the system) to prevent freezing of the evaporator.

2. Description of the Prior Disclosure

Recently, there have been proposed and developed various automatic air conditioning systems with a control unit which controls opening angle of doors, such as a fresh/recirculation switching air intake door, an air mixing door, a defroster door, a chest vent door, a foot vent door, or the like, and controls amount of air flowing through the evaporator of the air conditioning system in response to output signals from various sensors for detecting various physical quantities, such as an ambient temperature, room temperature in the vehicular cabin, magnitude of insolation, intake air temperature of the evaporator, suction pressure of the compressor, and in response to output signals indicative of ON/OFF state of various switches, such as an air conditioner switch, a blower switch, an ignition switch, a defroster switch, or so forth. In general, such an automatic air conditioning system controls the intake air temperature of air flowing through an evaporator to prevent the evaporator from freezing. Conventionally, the intake air temperature is measured just behind the evaporator. As is well known, a suction pressure of a compressor is correlatively lowered in accordance with the lowering of the intake air temperature of the evaporator. Therefore, the automatic air conditioning system conventionally controls the above mentioned suction pressure of the compressor in such a manner that the suction pressure is kept higher than a preset pressure which is determined on the basis of a threshold value at which the evaporator starts to freeze. The threshold value of the intake air temperature will be hereinafter referred to as a "freezing start possible temperature". In prior art air conditioning systems, to avoid freezing of the evaporator, that is, to prevent the suction pressure of the compressor from becoming lower than a preset pressure, the air conditioning system controls the suction pressure in such a manner that, if the suction pressure of the compressor becomes lower than the preset pressure, the discharge from the compressor is lowered and thus the cooling power of the system is lowered.

In such air conditioning systems for automotive vehicles, quick cooling is required when the room temperature of the vehicular cabin becomes excessively high, for example in the summer daytime. Under this condition, in conventional air conditioning systems, discharge from a compressor is increased by manually operating a control switch mounted on a controller of the system. One such automatic air conditioning system has been disclosed in the Japanese Utility Model First Application (Jikkai Showa) 60-22418.

However, in such conventional air conditioning systems for automotive vehicles, even if it is set for quick cooling, the air conditioning system controls the discharge of the compressor to lower level such that the suction pressure of the compressor is kept higher than the preset pressure, thereby preventing the evaporator from freezing. However, cooling power becomes lowered with the result that a cooling time required for cooling to a desired temperature within the vehicular cabin becomes long. Furthermore, in such quick cooling, the torque loss is large according to the long cooling time.

SUMMARY OF THE INVENTION

It is, therefore, in view of the above disadvantages, an object of the present invention to provide an automatic air conditioning system with a variable displacement compressor for automotive vehicles, which is capable of maintaining high cooling power of the system for a predetermined time even though the suction pressure of the compressor is lowered than the preset pressure according to lowering of intake air temperature of an evaporator of the system during quick cooling.

It is another object of the invention to provide an automatic air conditioning system with a variable displacement compressor for automotive vehicles, which has high durability and provides long life.

In order to accomplish the aforementioned and other objects, an automatic air conditioning system for automotive vehicles with a variable displacement compressor comprises first detecting means for detecting a first physical quantity indicative of cooling in an evaporator of the automatic air conditioning system, discharge changing means for essentially changing the discharge of the compressor on the basis of the difference between the first physical quantity and its preset value, first signal generating means for generating a first signal in response to quick-cooling requirements, and preset value changing means for changing the preset value of the first physical quantity in such a manner that, when the preset value changing means does not receive the first signal, the preset value is set to a first value at which an intake air temperature, defined by the temperature of the air flowing through the evaporator as measured just behind the evaporator, reaches a freezing start possible temperature, defined by the intake air temperature such that the freezing of the evaporator starts. When the preset value changing means receives the first signal, the preset value is set to a second value at which the intake air temperature reaches a predetermined temperature lower than the freezing start possible temperature. The discharge changing means operates in such a manner that, when the difference is plus, that is, the first physical quantity exceeds the preset value, the discharge volume is essentially increased, and when the difference is minus, that is, the first physical quantity is lower than the preset value, the discharge volume is essentially decreased. The first physical quantity is the intake air temperature, a suction pressure of said compressor, or a refrigerant temperature. The automatic air conditioning system further comprises second detecting means for detecting a second physical quantity indicative of environmental conditions in and around the automotive vehicle. The first signal generating means generates the first signal when it is determined that the thermal load to the evaporator exceeds a predetermined value on the basis of the second physical quantity. The second physical quantity is ambient temperature, magnitude of insolation, and/or room temperature in the vehicular cabin. The first signal generating means generates the first signal when a target discharge air temperature, calculated on the basis of the second physical quantity and a desired temperature input by temperature setting means, is lower than a predetermined temperature. The first signal generating means may generate the first signal when the room temperature exceeds a predetermined temperature. The preset value changing means maintains the preset value to the second value until a preset time elapses from a point of time when the intake air temperature has reached the freezing start possible temperature or until it is determined that room temperature in the vehicular cabin decreases and has reached the predetermined temperature. The preset value changing means determines that the room temperature has reached the predetermined temperature when the target discharge air temperature exceeds predetermined temperature. The preset time is suitably selected depending on the level of the ambient temperature or the room temperature. The automatic air conditioning system further comprises a manually operated switch for output a signal indicative of a quick-cooling requirement.

According to another aspect of the invention, an automatic air conditioning system for automotive vehicles with a variable displacement compressor, the compressor being operated in such a manner that, when the suction pressure of said compressor exceeds a preset pressure, the discharge of the compressor is increased, and when the suction pressure is equal to or is lower than the preset pressure, the discharge is decreased, comprises first detecting means for detecting a first physical quantity which is indicative of a cooling condition of an evaporator of the automatic air conditioning system, first signal generating means for generating a first signal indicative of requirement for quick-cooling, second signal generating means for generating a second signal indicative of the difference between the first physical quantity and its preset value, preset pressure changing means for changing the preset pressure in response to the second signal, and preset value changing means for changing the preset value of the first physical quantity in such a manner that, when the preset value changing means does not receive the first signal, the preset value is set to a first value at which an intake air temperature defined by the temperature of air flowing through the evaporator as measured just behind the evaporator reaches a freezing start possible temperature defined by the intake air temperature. when the preset value changing means receives the second signal, the preset value of the first physical quantity is set to a second value at which said intake air temperature reaches a predetermined temperature lower than the freezing start possible temperature.

According to a further aspect of the invention, variable displacement compressor used for an automatic air conditioning system for automotive vehicles, the compressor being operated in such a manner that, when the suction pressure of the compressor exceeds a preset pressure, the discharge of the compressor is increased, and when the suction pressure is equal to or is lower than the preset pressure, the discharge is decreased, comprises preset pressure changing means being capable of changing the preset pressure, the preset pressure changing means operating in such a manner that, when the preset value changing means does not receive a signal indicative of requirement for quick-cooling from the control unit of the automatic air conditioning system, the preset pressure is set to a first pressure at which intake air temperature, defined by the temperature of air flowing through the evaporator of the automatic air conditioning system as measured just behind the evaporator reaches the freezing start possible temperature. When the preset value changing means receives the signal indicative of a requirement for quick-cooling, the preset pressure is set to a second pressure at which the intake air temperature reaches a predetermined temperature lower than the freezing start possible temperature.

According to a still further aspect of the invention, an automatic air conditioning system for automotive vehicles with a variable displacement compressor comprises discharge means for compressing and discharging refrigerant, first detecting means for detecting a first physical quantity which is indicative of a cooling condition of an evaporator of the automatic air conditioning system, discharge changing means for changing discharge of refrigerant in such a manner that, when the first physical quantity exceeds a preset value, the discharge of the discharge means is essentially increased, and when the first physical quantity is equal to or is lower than the preset value, the discharge is essentially decreased, first signal generating means for generating a first signal indicative of requirement for quick-cooling, and preset value changing means for changing the preset value of the first physical quantity in such a manner that, when the preset value changing means does not receive the first signal, the preset value of the first physical quantity is set to a first value at which an intake air temperature defined by the intake air temperature of air flowing through the evaporator just behind the evaporator reaches to a freezing start possible temperature defined by the intake air temperature such that the freezing of the evaporator starts, and when the preset value changing means receives the first signal, the preset value of the first physical quantity is set to a second value at which said intake air temperature reaches a predetermined temperature lower than the freezing start possible temperature.

BRIEF DESCRIPTION OF THE DRAWINGS

FIG. 6 is a flow chart representative of a program for controlling the variable displacement compressor according to the invention.

FIG. 6A is a state transition graph illustrating two states of the engine speed of an automotive vehicle.

FIG. 7 is a flow chart representative of a program for quick cooling controlling the automatic air conditioning system according to the invention.

FIG. 7A is a graph illustrating the relationship between an intake air temperature of the evaporator and the elapsed time, during the quick cooling operation.

FIG. 13 is a flow chart representative of a program for controlling the compressor under the low-temperature DEMIST mode wherein a defroster door and a foot vent door are open and a chest vent door is closed.

DESCRIPTION OF THE PREFERRED EMBODIMENT

Figure 1:
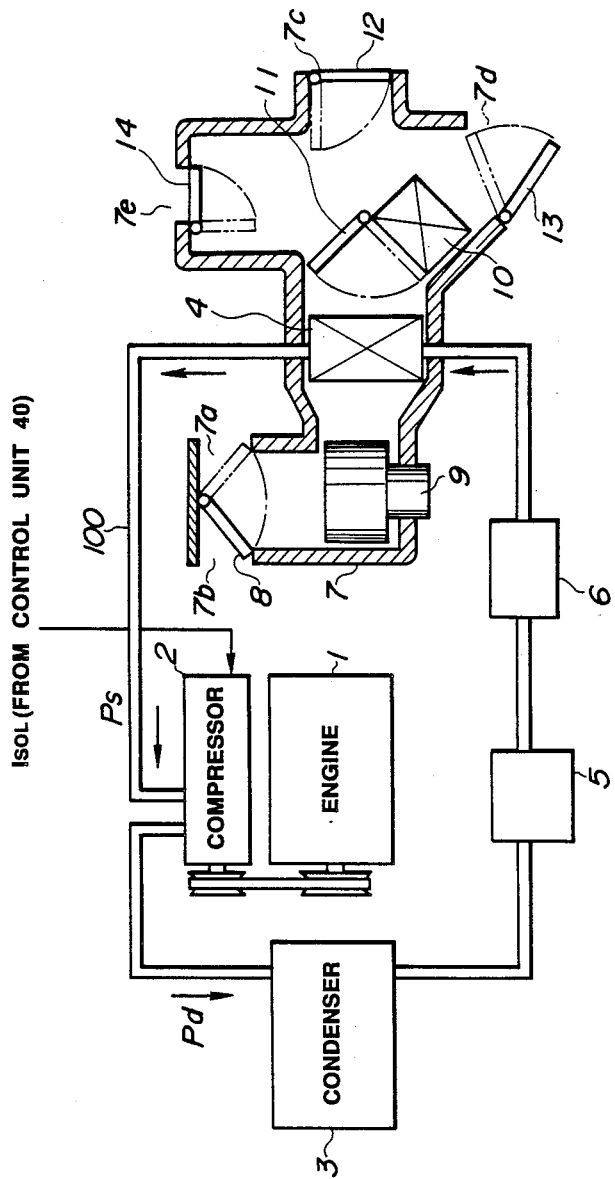
FIG. 1 is a system diagram illustrating the main components of an automatic air conditioning system for automotive vehicles according to the invention.

Referring now to FIGS. 1 to 14B, particularly to FIG. 1, the preferred embodiment of an automatic air conditioning system for automotive vehicles comprises a compression/refrigerating cycle type of cooler unit 100 having a variable displacement compressor 2 which is driven by an engine 1, a condenser 3, an evaporator 4, a liquid tank 5, and an expansion valve 6. The variable displacement compressor 2 discharges larger refrigerant volumes only when the suction pressure Ps exceeds the preset pressure Pr. The preset pressure Pr is controlled by a solenoid current $I_{SOL}$ provided from a control unit 40 shown in FIG. 4 as mentioned below.

On the other hand, the evaporator 4 is provided in an air conditioning duct 7 which has a fresh air inlet 7a and a recirculation air inlet 7b. A fresh/recirculation switching air intake door 8 is mounted on the inner wall of the duct 7 for controlling the amount of air flowing through each of the inlets 7a and 7b. In the duct 7, as is generally known, provided are a blower 9, a heater unit 10, and an air mixing door 11. Furthermore, the duct 7 has a chest vent 7c, a foot vent 7d, and a defroster nozzle 7e. The air-flows through the chest vent 7c, the foot vent 7d, and the defroster nozzle 7e are respectively controlled by a chest vent door 12, a foot vent door 13, and a defroster door 14 which are mounted on the inner wall of the duct 7. Although it is not shown in FIG. 1, for simplification of the drawing, these doors, namely the air intake door 8, the air mixing door 11, the chest vent door 12, the foot vent door 13, and the defroster door 14 are driven by means of a plurality of actuators shown in FIG. 4, namely an air intake door actuator 50, an air mixing door actuator 51, a chest vent door actuator 52, a foot vent door actuator 53, and a defroster door actuator 54.

The variable displacement compressor 2 will be described in detail by FIGS. 2, 2A, 2B, and 3. As clearly shown in FIG. 2, in this embodiment, a swash plate type of variable displacement compressor 2 is used for the cooling unit 100. The swash plate 25 is provided in a casing chamber 21R of a casing 21 of the compressor 2 for controlling the discharge of the compressor 2 in such a manner that, when the suction pressure Ps is introduced into the casing chamber 21R, the slope angle of the swash plate 25 becomes higher, or when the discharge pressure Pd is introduced into the casing chamber 21R, the slope angle of the swash plate becomes lower.

Figure 2:
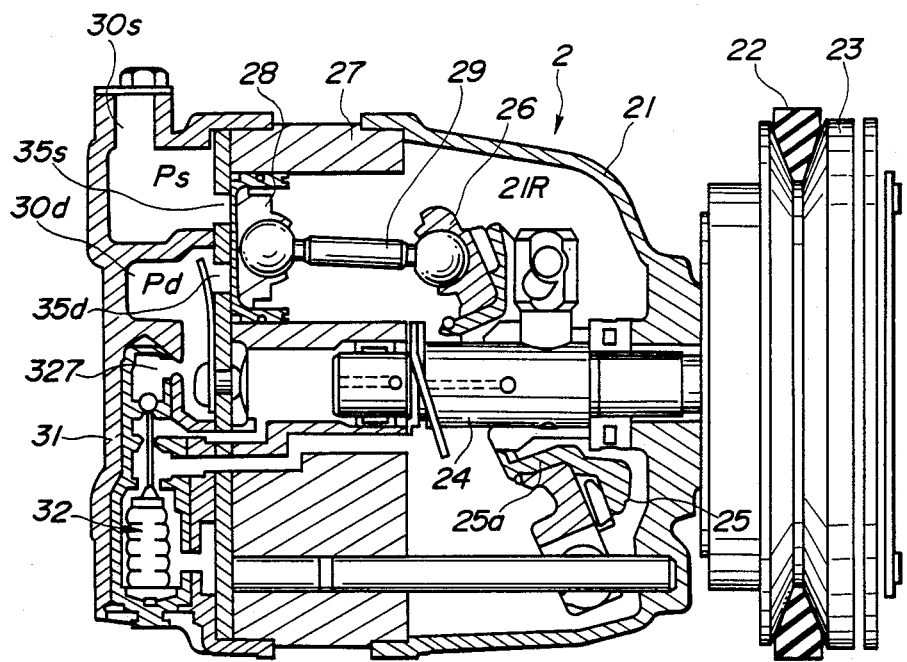
FIG. 2 is a longitudinal sectional view illustrating the preferred embodiment of a variable displacement compressor according to the invention.

As shown in FIG. 2, a rotational shaft 24 is provided in the casing 21 of the compressor 2. The rotational shaft 24 is rotated through a pulley 23 by way of a belt 22 which is driven by the engine 1. The swash plate 25 is fixed obliquely to the axis of rotation of the rotational shaft 24. A non-rotary wobble 26 engages with the swash plate 25 through a journal 25a of the swash plate 25. A piston 28 which slidingly reciprocates within a cylinder chamber formed in a cylinder block 27, is connected through a piston rod 29 to the non-rotary wobble 26 in such a manner that the piston 28 is rotatably connected to a first ball joint 29A of the piston rod 29 and the non-rotary wobble 26 is rotatably connected to a second ball joint 29B of the piston rod 28. When the swash plate 25 rotates with the rotational shaft 24, the second ball joint 29B reciprocates along the substantially axial direction of the piston 28 in accordance with the oscillating movement of the non-rotary wobble 26 with the result that the piston 28 reciprocates along the axis thereof. In accordance with the reciprocation of the piston 28, refrigerant is sucked via a suction chamber 30s, through a suction opening 35s and is discharged through a discharge opening 35d into a discharge chamber 30d such that, in FIG. 2, the refrigerant is sucked via the suction chamber 30s according to the right-hand directional movement of the piston and it is discharged into the discharge chamber 30d according to the lefthand directional movement of the piston. Although it is not shown in FIG. 2, these openings 35s and 35d are suitably opened and closed according to the reciprocation of the piston 28 by way of valve means which are provided at the openings 35s and 35d. Although only one piston 28 is shown in FIG. 2, the variable displacement type of compressor 2 is essentially a multiple-cylinder type of compressor in which a plurality of pistons 28 are connected to the corresponding plurality of piston rods 29, each second ball joint 29B being arranged at regular interval on the circumference of the nonrotary wobble 26. In this manner, the refrigerant under high pressure is fed from the compressor 2 to the condenser 3.

Figure 2A:
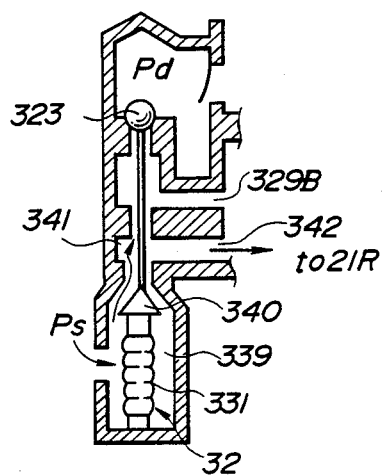
FIG. 2A is a sectional view illustrating the preferred embodiment of a control valve of the variable displacement compressor under a condition wherein a suction pressure of the compressor exceeds a preset pressure.
Figure 2B:
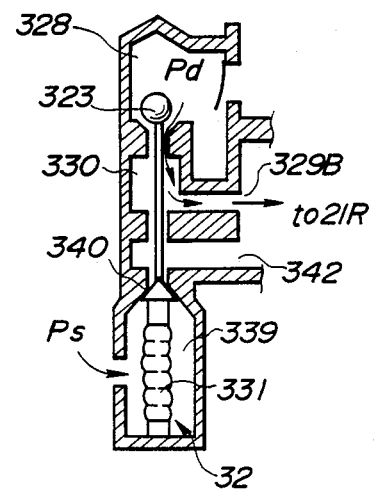
FIG. 2B is a sectional view illustrating the preferred embodiment of the control valve of the variable displacement compressor under a condition wherein a suction pressure of the compressor is equal to or lower than a preset pressure.

As best shown in FIG. 2A, when the suction pressure Ps is introduced into the casing chamber 21R, the slope angle of the swash plate 25 becomes higher, and as shown in FIG. 2B, when the discharge pressure Pd is introduced into the casing chamber 21R, the slope angle of the swash plate 25 becomes lower. In order to selectively communicate the casing chamber 21R with either the suction chamber 30s or the discharge chamber 30d, the variable displacement type of compressor 2 has a control valve 32 in an end cover 31 thereof. The construction of the control valve 32 will be described in detail by FIG. 3.

Figure 3:
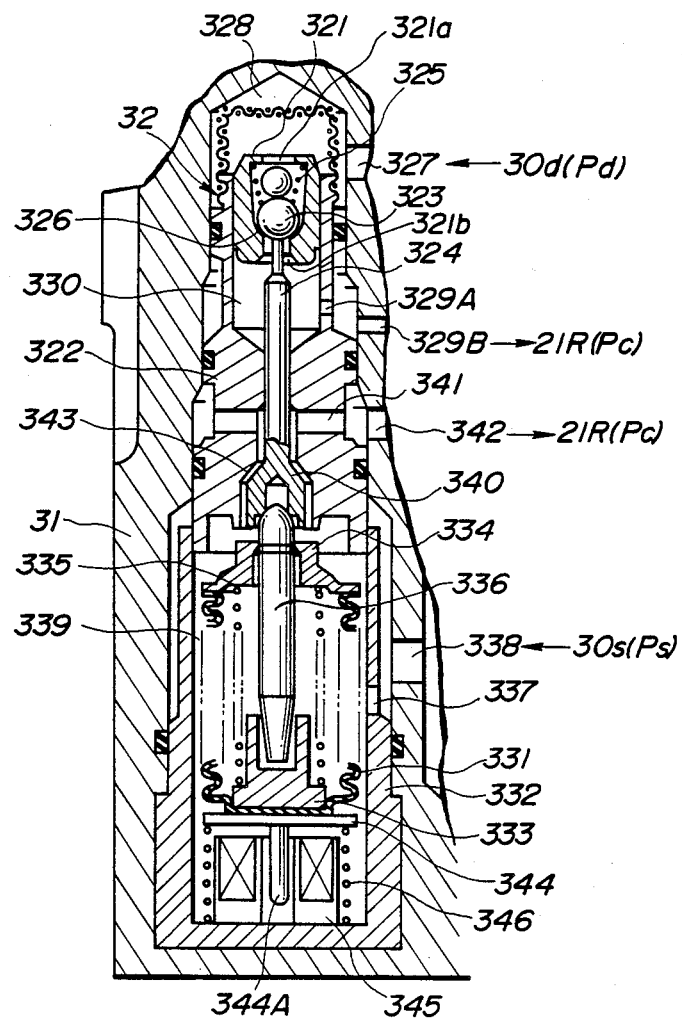
FIG. 3 is a detailed sectional view illustrating the internal construction of the preferred embodiment of a control valve according to the invention.

As shown in FIG. 3, the control valve 32 has a substantially cylindrical valve body 322 which sealingly engages a substantially cylindrical valve seat 321 at the top end thereof such that the valve seat 321 inserted into the valve body 322 under press fit. A valve pin 324 is slidably inserted in the cylindrical valve body 322 in such a manner that the axis of the former is consistent with that of the latter. A ball 323 is fixed on the top end of the valve pin 324 within the valve seat 321 for opening or closing the lower opening 321b of the valve seat 321. The ball 323 is normally urged downwardly in the axial direction of the valve pin 324 by means of a conical spring 325 such that the spherical surface of the ball 323 abuts the ball seat 326. A high-pressure chamber 328 is defined by the space between the inner wall of the end cover and the top end of the valve seat 321. The high-pressure chamber 328 communicates through the port 327 with the suction chamber 30d and further the high-pressure chamber 328 communicates via the upper opening 321a of the valve seat 321 through the lower opening 321b of the valve seat 321 with an inner chamber 330. The inner chamber 330 communicates via a port 329A which is formed in the valve body 322 through a second port 329B which is formed in the end cover 31, with the casing chamber 21R. As set forth above, the ball 323 functions as a valve so as to establish or prevent the communication between the high-pressure chamber 328 and the inner chamber 330. As seen in FIG. 3, the inner peripheral surface of valve body 322 sealingly mates the outer peripheral surface of the valve pin 324 at the substantially intermediate portion of the valve body 322.

On the other hand, an end cap 332 is mounted on the lower end of the valve body 322 in an air-tight fashion such that the inner peripheral surface of the end cap 332 hermetically mates the bottom surface of the valve body 322. The end cap 332 includes a bellows 331 therein. An end member 334 is hermetically provided on the top end of the bellows 331 in an air-tight fashion, while a spring set 333 is disposed on the lower end of the bellows 331. A compression spring 335 is provided between the inner wall of the end member 334 and the spring seat 333 in such a manner that the bellows 331 is normally stretched in the longitudinal direction thereof by spring force. Furthermore, a center rod 336 extends from the cylindrical hollow of the spring seat 333 through the center opening of the end member 334 to the bottom end portion of the valve pin 324 in the substantially axial direction of the valve pin 324. A cuspidal top end of the center rod 336 mates the bore which is formed at the bottom end of the valve pin 324. The center rod 336 is firmly fixed to the inner surface of the end member 334 at the point adjacent to the cuspidal top end thereof. On the other hand, the frusto-conical lower end of the center rod 336 is slidably inserted into the cylindrical hollow of the spring seat 333. In this construction, only the relative distance between the frusto-conical lower end of the center rod 336 and the spring seat 333 is changed according to the expansion and contraction of the bellows 331.

A control chamber 339 is defined by the space between the bellows 331 and the end cap 332. The control chamber 339 communicates through ports 337 and 338, which are respectively formed in the end cap 332 and the end cover 31, with the suction chamber 30s. The control chamber 339 communicates through the flow passage defined by the space between a substantially frusto-conical valve seat 343 and a substantially frusto-conical valve portion 340 with an intermediate chamber 341 of the valve body 322. The intermediate chamber 341 communicates, through a port 342 formed in the end cover 31, with the casing chamber 21R.

Figure 4:
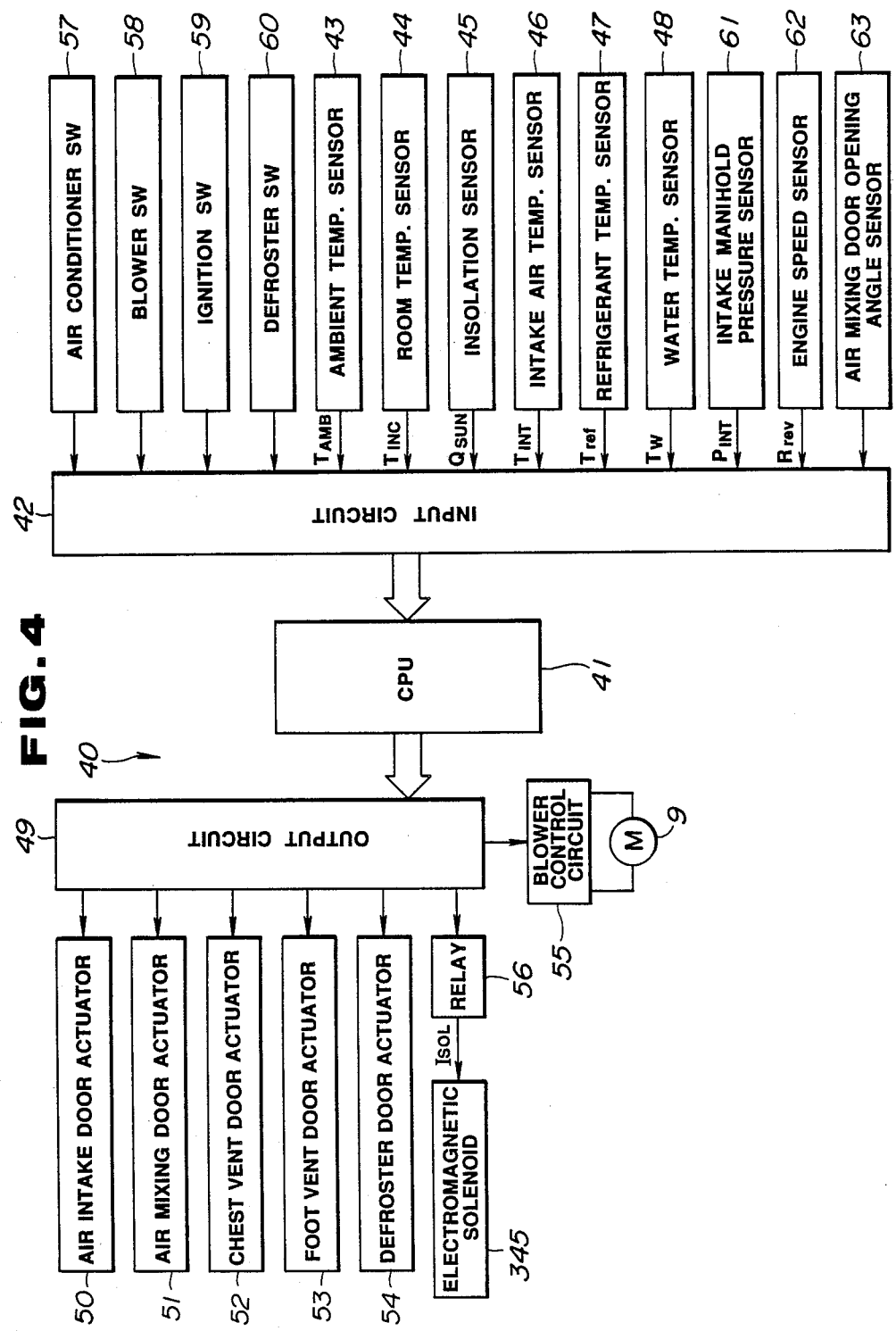
FIG. 4 is a block diagram illustrating the control circuit controlling respective components of an automatic air conditioning system according to the invention.

As best seen in FIG. 3, a movable disc plate 344 is firmly fixed through the bottom face of the bellows 331 on the bottom end of the spring seat 333. A plunger 344A of an electromagnetic solenoid 345 is connected to the movable disc plate 344 such that the axis of the plunger 344A is essentially consistent with that of the center rod 336. A return spring 346 is arranged between the bottom face of the end cap 332 and the perimeter of the movable disc plate 344 and in a manner to surround the solenoid 345 for normally bissing the movable plate 344 toward the bottom surface of the spring seat 333. The spring constant of the return spring 346 is set sufficiently higher than that of the compression spring 335. The electromagnetic solenoid 345 is connected through a relay 56 to a output circuit 49 as shown in FIG. 4. The stroke of the plunger 344A is controlled by a solenoid electric current $I_{SOL}$ as mentioned below.

When the suction pressure Ps of the compressor 2 exceeds the preset pressure Pr which is mainly determined by the internal pressure within the bellows 331 and the spring constant of the compression spring 335, the bellows 331 is contracted against the spring force caused by the spring 335 with the result that the center rod 336 moves downward. The valve pin 324 moves downward along with the center rod 336 due to the spring force caused by the conical spring 325. Under this condition, the movable plate 344 does not move, while the ball 323 abuts the ball seat 326 and simultaneously the valve portion 340 moves away from the valve seat 343. This condition of the higher suction pressure Ps than the preset pressure Pr is shown in FIGS. 2A and 3. As clearly seen in FIG. 2A, the suction pressure Ps is introduced from the control chamber 339 through the port 342 to the casing chamber 21R, via the intermediate chamber 341, thereby causing higher slope angle of the swash plate 25. As a result, the discharge of the compressor 2 is increased.

Conversely, when the suction pressure Ps is equal to or lower than the preset pressure Pr, the center rod 336 moves upward by the spring force of the spring 335 with the result that the valve pin 324 is pushed up. As a result, the ball 323 moves away from the ball seat 326 and while the valve portion 340 sealingly mates the valve seat 343. Under this condition as well, the movable plate 344 does not move. This condition of the lower suction pressure Ps of than the preset pressure Pr is shown in FIG. 2B. As clearly shown in FIG. 2B, the discharge pressure Pd is introduced from the high-pressure chamber 328 through the inner chamber 330 via the ports 329A and 329B to the casing chamber 21R, thereby causing lower slope angle of the swash plate 25. As a result, the discharge of the compressor 2 is decreased.

Consequently, such a variable displacement compressor controls the slope angle of the swash plate on the basis of the difference of pressure between the cylinder chamber and the casing chamber, that is, the difference of pressure before and behind the pistons.

One such swash plate type of variable displacement compressor has been disclosed in the U. S. Pat. No. 4,428,718 entitled "VARIABLE DISPLACEMENT COMPRESSOR CONTROL VALVE ARRANGEMENT" said patent was granted on Jan. 31, 1984 and assigned to the assignee "GENERAL MOTORS CORPORATION". The disclosure of the above-identified United States Patent is herein incorporated by reference for the sake of disclosure.

In accordance with the invention, the above mentioned preset pressure Pr of the variable displacement compressor can be changed as follows.

When the electromagnetic solenoid 345 is demagnetized, the movable plate 344 is positioned at a point where the compression spring 335 balances with the return spring 346. This point will be hereinafter referred to as a "balancing point". The position of the movable plate 344 moves upward away from the balancing point in a manner essentially proportional to an increase in the solenoid current $I_{SOL}$ with the result that the preset pressure Pr is increased in a manner essentially proportional to an increase in the solenoid current $I_{SOL}$.

FIG. 4 shows a control circuit 40 for the preferred embodiment of the automotive automatic air conditioning system according to the present invention. The control circuit 40 comprises a central processing unit (CPU) 41 which is connected through an input circuit 42 to an ambient temperature sensor 43 for detecting an ambient temperature $T_{AMB}$, a room temperature sensor 44 for detecting temperature $T_{INC}$ in the vehicular cabin, an insolation sensor 45 for detecting magnitude of insolation $Q_{SUN}$, an intake air temperature sensor 46 for detecting temperature $T_{INT}$ of air flowing just downstream of the evaporator 4, a refrigerant temperature sensor 47 being provided in the outlet of the expansion valve 6 for detecting refrigerant temperature $T_{ref}$, a water temperature sensor 48 for detecting temperature $T_W$ of cooling water for cooling the engine 1. Furthermore, the input circuit 42 is connected to an air conditioner switch 57, a blower switch 58, an ignition switch 59, a defroster switch 60, an intake pressure sensor 61 for detecting an intake manifold pressure, an engine speed sensor 62 for detecting engine speed, and an air mixing door opening angle sensor (air mix door angle sensor) 63 for detecting an opening angle of the air mixing door 11.

The CPU 41 is connected through an output circuit 49 to an air intake door actuator 50, an air mixing door actuator 51, a chest vent door actuator 52, a foot vent door actuator 53, a defroster door actuator 54, and a blower control circuit 55 which is connected to the blower motor 9. The output circuit 49 is also connected through a relay 56 to an electromagnetic solenoid 345 mounted in the aforementioned control valve 32.

In this construction, the CPU 41 controls suitably the actuators 50 to 54 and the solenoid 345 in such a manner that the CPU changes the opening angle of each door and controls magnitude of electric current to be supplied to the solenoid 345 on the basis of the information input through the input circuit 42 from the sensors 43 to 48, the sensors 61 to 63, and the switches 57 to 60. In other words, the CPU suitably controls the amount of air to be discharged through each door, the temperature of air to be discharged through each door, and the preset pressure Pr of the control valve 32. The CPU further controls the blower motor 9 by means of the blower control circuit 55 in response to an air-flow signal which is indicative of the amount of air to be discharged from the blower fan. This air-flow signal is determined by the CPU 41 on the basis of the signals from the air mixing door opening angle sensor 63 and the intake air temperature sensor 46 according to the conventional method of the prior art automotive automatic air conditioning systems.

Figure 5:
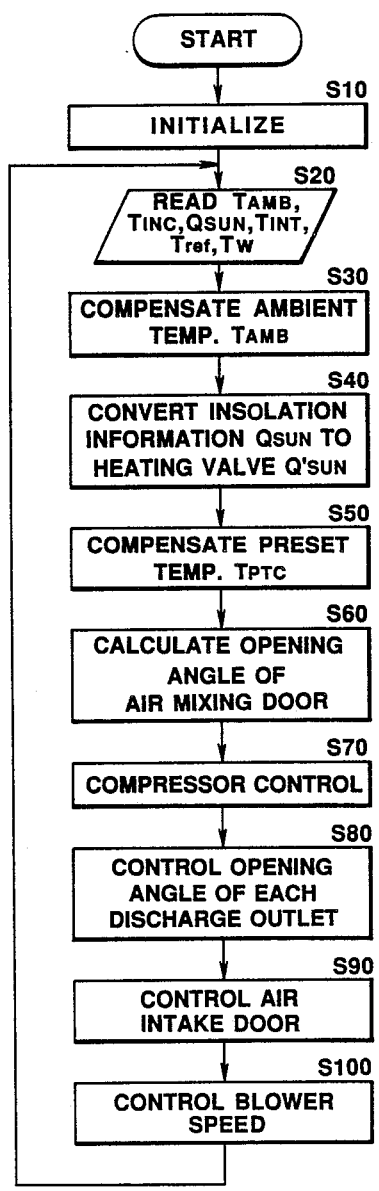
FIG. 5 is a flow charg representative of a basic program to control an automatic air conditioning system according to the invention.

This control unit 40 for the air conditioning system of the invention will be operated in accordance with the order of steps of a flow chart shown in FIG. 5.

In Step 10 (S10), in which the automatic air conditioner system is automatically operated by the control unit 40, the memorized values in the CPU 41 are initialized to predetermined values. For example, a preset temperature $T_{PTC}$ is initialized to a predetermined temperature, such as, for example "25° C.".

In Step 20 (S20), the CPU 41 receives the information $T_{AMB}$, $T_{INC}$, $Q_{SUN}$, $T_{INT}$, $T_{ref}$, and $T_W$ through the input circuit 42 from the respective sensors, namely the ambient temperature sensor 43, the room temperature sensor 44, the insolation sensor 45, the intake air temperature sensor 46, the refrigerant temperature sensor 47, and the water temperature sensor 48. In Step S20, the CPU 41 further receives the desired preset temperature $T_{PTC}$ input by a passenger through a control panel (not shown). Therefore, the automatic air conditioning system is automatically operated depending on the desired preset temperature.

In Step 30 (S30), the CPU compensates the ambient temperature $T_{AMB}$ input from the sensor 43 to a value $T_{AM}$, which is in close proximity to the actual ambient temperature, in consideration of thermal effect due to other heat sources, such as a condenser, a radiator, and the like.

In Step 40 (S40), the CPU converts the insolation information input from an insolation sensor, such as a photodiode, to the heating value $Q'_{SUN}$.

In Step 50 (S50), the CPU compensates the preset temperature $T_{PTC}$ on the basis of the compensated ambient temperature $T_{AM}$.

In Step 60, the CPU calculates a target discharge air temperature $T_0$ on the basis of the compensated preset temperature $T'_{PTC}$, the room temperature $T_{INC}$, the compensated ambient temperature $T_{AM}$, and the insolation $Q'_{SUN}$ and further calculates an opening angle of the air mixing door 11 on the basis of the difference between the target discharge air temperature $T_0$ and the actual discharge air temperature. The actual discharge air temperature is derived on the basis of the intake air temperature $T_{INT}$ and a present opening angle X of the air mixing door 11 input from the air mixing door opening angle sensor 63. The control procedure of the opening angle of the air mixing door 11 will be hereinbelow detailed in accordance with the flow chart in FIG. 10.

In Step 70 (S70), the compressor 2 is controlled by the CPU. The control procedure of the compressor 2 will be hereinbelow described in detail according to the flow chart in FIG. 6.

In Step 80 (S80), the CPU controls the opening angle of each of the doors 12, 13, and 14 through which conditioned air is discharged into the vehicular cabin.

In Step 90 (S90), the CPU controls the air intake door 8 for selectively switching as to whether the intake air is introduced through the fresh air inlet 7a or through the recirculation air inlet 7b.

In Step 100 (S100), the CPU controls the speed of the blower 9 for adjusting the amount of air to be discharged through the doors 12, 13 and 14.

FIG. 6 shows a flow chart for controlling the compressor 2 according to the present invention at Step S70 of FIG. 5.

The compressor control routine begins at Step 700 (S700) and then proceeds to Step 701 (S701) at which a test is made to determine whether a blower is ON or OFF in response to the input signal from the blower switch 58. If the answer to Step S701 is in the negative (no), the compressor 2 is stopped at Step 702 (S702). If the answer to Step S701 is in the affirmative (yes), the Step 703 (S703) proceeds to test whether the refrigerant temperature $T_{ref}$ is within a first state or a second state as shown in the state transition graph at Step S703 and the discriminated state of the refrigerant temperature $T_{ref}$ is stored in a predetermined first memory in the CPU. According to the transition graph of Step S703, it is required that the refrigerant temperature $T_{ref}$ exceeds the predetermined temperature $T_{ref2}$, for example 0° C. so as to transit from the second state to the first state. Conversely, it is required that the refrigerant temperature $T_{ref}$ becomes lower than the predetermined refrigerant temperature $T_{ref1}$, for example −15° C. so as to transit from the first state to the second state. In other words, the difference between the temperature $T_{ref1}$ and $T_{ref2}$ corresponds to a hysteresis for preventing the compressor 2 from frequently starting or switching OFF. The refrigerant temperature $T_{ref}$ lying in the first state means that thermal load is relatively high. Conversely, the refrigerant temperature $T_{ref}$ lying in the second state means that thermal load is relatively low, such as the wintertime. In Step S704, if the refrigerant temperature $T_{ref}$ is in the second state, Step S702 proceeds and, as noted previously, the compressor 2 is stopped. In Step S704, if the refrigerant temperature $T_{ref}$ is in the first state, Step 705 (S705) proceeds in which a test is made to determine on the basis of the input signal from the engine speed sensor 62 whether, according to FIG. 6A, the engine output $R_{rev}$ is at a high-revolution state or at a low-revolution state. As set forth above, the difference between these engine speeds $R_{rev1}$, for example 4,500 r.p.m. and $R_{rev2}$, for example 5,000 r.p.m. corresponds to a hysteresis through which the state of engine output changes from a low-rev. state to a high-rev. state or vice versa. For example, in order to change from the low-rev. state to the high-rev. state, it is required that the engine exceeds the revolution $R_{rev2}$. In Step S705, if the engine output $R_{rev}$ is in the low-rev. state, Step 706 (S706) is entered in which a test is made to discriminate whether the compensated ambient temperature $T_{AM}$ is in a third state, a fourth state, or a fifth state. After this, the discriminated state of the ambient temperature $T_{AM}$ is stored in a predetermined second memory in the CPU. As set forth above, the difference between a predetermined temperature $T_{AM1}$, for example −5° C. and a predetermined temperature $T_{AM2}$, for example −2° C. corresponds to a hysteresis for transition between the fourth state and the fifth state. Likewise, the difference between a predetermined temperature $T_{AM3}$, for example 5° C. and a predetermined temperature $T_{AM4}$, for example 8° C. corresponds to a hysteresis for transition between the third state and the fourth state.

In Step S705, if the engine speed $R_{rev}$ is in the high-speed state, Step 712 (S712) is entered in which the variable displacement compressor 2 is so controlled as to operate under small stroke condition of the plurality of the pistons 28, thereby causing relatively small discharge from the compressor 2. Therefore, the compressor 2 can be driven at a relatively low torque and as a result torque absorbed by the compressor 2 is relatively small. The control of the compressor 2 as executed in Step S712 will be hereinafter referred to as a "destroke control".

In Step 707 (S707), a test is made to determine whether the defroster switch 60 is ON. If the answer to Step S707 is in the negative (no), Step 708 (S708) proceeds in which a test is made to determine whether the target discharge air temperature $T_0$ calculated at the Step S60 of FIG. 5 is lower than a temperature $T_{rcd}$, for example −10° C. at which the air mixing door 11 is operated in a fully closed position in which the air mixing door 11 shunts all of the air to flow into the heater unit 10. If the answer to Step S708 is in the affirmative (yes), Step 709 (S709) proceeds in which the compressor 2 is operated under a quick cooling condition. The control of the compressor 2 as shown in Step S709 will be hereinafter referred to as a "quick cool-down control". Step S708 is executed once when the ignition switch 59 is changed from an OFF state to an ON state or the blower switch 58 is changed from an OFF state to an ON state.

As described below, the "quick cool-down control" will be executed in accordance with the flow chart in FIG. 7. The "quick cool-down control" routine begins at Step 7090 (S7090) and then at Step 7091 (S7091) a target intake air temperature $T'_{INT}$, which represents a target temperature of air flowing through the evaporator 4 at an outlet of the evaporator 4, is set to a predetermined temperature $T_1$, for example 0° C. and a timer TIMER1 is set to a predetermined time $t_1$ which is less than the time required to freeze the evaporator. In this manner, in the "quick cool-down control" according to the invention, the target intake air temperature $T'_{INT}$ can be set to a temperature $T_1$ lower than the aforementioned "freezing start possible temperature" $T_4$, for example 3° C. The reason for this low target temperature setting is for situations, when ambient air temperature is excessively high, for example during the summer daytime hours. Due to the preset time interval TIMER1, the evaporator 4 never freezes, even if the actual intake air temperature $T_{INT}$ is set to the temperature $T_1$ lower than the "freezing start possible temperature" $T_4$. This is experimentally assured by the inventors of the invention.

In Step 7092 (S7092), an electric current $I_{SOL1}$ to be supplied to the solenoid 345 is calculated and then the solenoid current $I_{SOL1}$ is supplied through the relay 56 to the solenoid 345 based on the calculated value.

Figure 8:
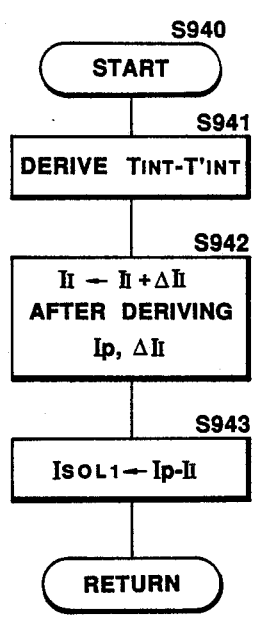
FIG. 8 is a flow chart representative of a program for controlling the solenoid current supplied to an electromagnetic solenoid which is used for changing the preset pressure of the control valve of the compressor according to the invention.
Figure 8B:
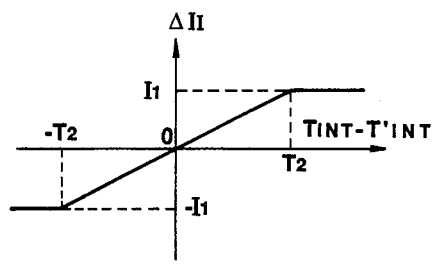
FIGS. 8A and 8B are graphs used for deriving the solenoid current on the basis of the difference between an actual intake air temperature of the evaporator and a target intake air temperature.
Figure 8A:
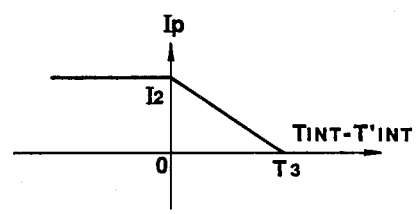

The solenoid current $I_{SOL1}$ control in Step S7092, will be executed according to the flow chart in FIG. 8. The solenoid current control routine begins at Step 940 (S940) and then at Step 941 (S941), the difference ($T_{INT}-T'_{INT}$) between the intake air temperature $T_{INT}$ and the target intake air temperature $T'_{INT}$ is calculated. Next, in Step 942 (S942), a first electric current $I_p$ and a second electric current $I_I$ are respectively derived in accordance with the graphs in FIGS. 8A and 8B based on the difference ($T_{INT}-T'_{INT}$). The first electric current $I_p$ is directly read from the graph of FIG. 8A. On the other hand, the second electric current $I_I$ is calculated in a manner to add an additional electric current $\Delta I_I$, which is derived from the graph of FIG. 8B, to the present second electric current $I_I$ and as a result the second current $I_I$ is renewed to the second current $I_I +$$\Delta I_I$. In FIGS. 8A and 8B, the values of current $I_1$ and $I_2$, and the values of temperature $T_2$, and $T_3$ are respectively, for example 0.98mA, 0.8A, 6° C., and 20° C. and these values are exerimentally determined so as to suitably operate the solenoid 345. Subsequently, in Step 943 (S943), the solenoid current $I_{SOL1}$ is finally calculated as the difference ($I_p-I_I$) between the first electric current $I_p$ and the renewed second electric current $I_I$. In the above mentioned solenoid current control, the unit of the first and second electric currents are respectively "A" and "mA". As will be appreciated from the above, magnitude of the solenoid current $I_{SOL1}$ is mainly determined by the first electric current $I_p$ and is slightly compensated by the second electric current $I_I$. In this way, the solenoid current $I_{SOL1}$ is finely controlled according to the procedure of FIG. 8. In FIGS. 8A and 8B, when the difference ($T_{INT}-T'_{INT}$) is equal to "0", the solenoid current $I_{SOL1}$ is equal to the difference ($I_2-I_I$) between the first current $I_2$ and the second current $I_I$. Under application of the solenoid current ($I_2-I_I$), the movable plate 344 is positioned in a particular position upward of the above mentioned "balancing point". This position of the movable plate 344 will be referred to as an "initial position". When the movable plate is positioned in the "initial position", a particular preset pressure Pr is defined. This particular preset pressure will be referred to as an "initial preset pressure". In this preferred embodiment, the "initial preset pressure" is set to the particular preset pressure based on the "freezing start possible temperature" $T_4$. Therefore, if the intake air temperature $T_{INT}$ is equal to the temperature $T_4$ ($T_{INT}=T_4$), the initial preset pressure is held because the solenoid current $I_{SOL1}$ is not changed. If the intake air temperature $T_{INT}$ is higher than the temperature $T_4$ ($T_{INT}>T_4$), the initial preset pressure is decreased according to decrease in the solenoid current $I_{SOL1}$. Further, if the intake air temperature $T_{INT}$ is lower than the temperature $T_4$ ($T_{INT}<T_4$), the preset pressure is increased according to increase in the solenoid current $I_{SOL1}$.

After the solenoid current control in Step S7092 of FIG. 7, Step 7093 (S7093) proceeds in which a test is made to determine whether the intake air temperature $T_{INT}$ is equal to the "freezing start possible temperature" $T_4$. If the answer to Step S7093 is in the negative (no), the routine returns from Step S7093 to Step S7092 and thus Steps 7092 and 7093 are repeated until the answer to Step S7093 becomes affirmative (yes). If the answer to Step S7093 is in the affirmative, that is, $T_{INT}=T_4$, Step 7094 (S7094) proceeds in which the timer TIMER1 starts.

In Step 7095 (S7095), the solenoid current $I_{SOL1}$ is controlled in accordance with the same solenoid current control routine shown in FIG. 8 as Step S7092.

In Step 7096 (S7096), a test is made to determine whether the target discharge air temperature $T_0$ is higher than a predetermined temperature $T_5$, for example 8° C. at which the air mixing door 11 starts to move from the closed position to the open position for supplying the air passing through the evaporator 4 into the heater unit 10. If the answer to Step S7096 is in the affirmative (yes), Step 7098 (S7098) proceeds in which the target intake air temperature $T'_{INT}$ is incremented by 1° C./sec. If the answer to Step S7096 is in the negative (no), Step 7097 (S7097) proceeds in which a test is made to determine whether the preset time $t_1$ of the timer TIMER1 has elapsed. If the answer to Step 7097 is in the negative (no), the routine returns from Step S7097 to Step S7095. If the answer to Step 7097 is in the affirmative (yes), Step S7098 proceeds. After Step S7098, the procedure returns from the "quick cool-down control" routine to Step S80 of FIG. 5.

As will be appreciated from FIGS. 8, 8A, and 8B, during the "quick cool-down control" as shown in FIG. 7, the magnitude of the solenoid current $I_{SOL1}$ is quickly decreased until the intake air temperature $T_{INT}$ of the evaporator 4 reaches through the "freezing start possible temperature" $T_4$ to the temperature $T_1$. Under this condition, the movable plate 344 moves downward, thereby causing the lowering of the preset pressure Pr. As a result, since the state as shown in FIG. 2A at which the suction pressure Ps is higher than the preset pressure Pr, is satisfied even if the suction pressure Ps is relatively low, the large slope angle of the swash plate 25 of the compressor 2 is maintained. That is to say, the discharge of the compressor 2 is kept at a high level, thereby maintaining optimal cooling power during the quick cool-down control.

As clearly seen from FIGS. 7 and 7A, the "quick cool-down control" of the compressor 2 is continued until the target discharge air temperature $T_0$ is higher than the temperature $T_5$ or until the preset time $t_1$ elapses from a time when the intake air temperature $T_{INT}$ has decreased to the temperature $T_4$ after setting the target intake air temperature $T'_{INT}$ to the predetermined temperature $T_1$. In this manner, the compressor 2 is driven for the predetermined time intervals $t_1$ at conditions of maximal discharge during the "quick cool-down control".

In Step S708 of FIG. 6, if the answer is in the negative, that is, the target discharge air temperature $T_0$ is equal to or higher than the temperature Trcd, Step 710 (S710) proceeds in which a test is made to determine whether the vehicle is under acceleration based on an intake manifold pressure $P_{INT}$ detected by the intake pressure sensor 61. If the answer to Step 710 is in the affirmative (yes), Step 711 proceeds in which a test is made to determine whether the intake air temperature $T_{INT}$ of the evaporator 4 is lower than a predetermined temperature $T_{INT1}$, for example 5° C. If the answer to Step 711 is in the affirmative (yes), Step 712 (S712) proceeds in which the aforementioned "destroke control" is executed.

Figure 9:
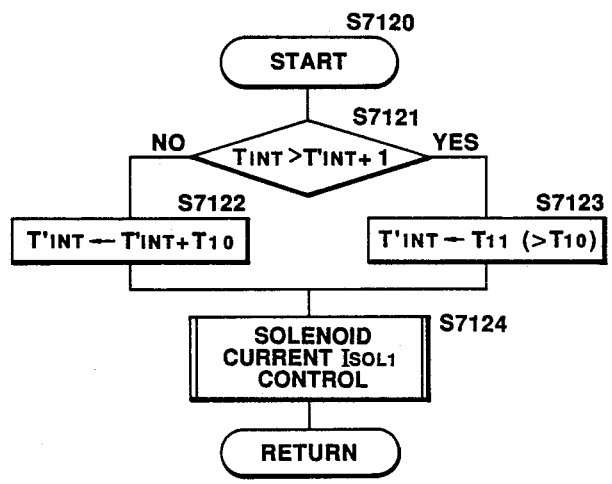
FIG. 9 is a flow chart representative of a program for controlling a plurality of pistons within the compressor under a small stroke condition, when the engine is driven at a high revolutions or the automotve vehicle is under acceleration.

As shown in FIG. 9, the "destroke control" begins at Step 7120 (S7120) and then Step 7121 (S7121) proceeds in which a test is made to determine whether the intake air temperature $T_{INT}$ is higher than the temperature $(T'_{INT}+1)$. As this target intake air temperature $T'_{INT}$, derived is the final preset value of the target intake air temperature $T'_{INT}$ in a previously executed compressor control, either of all of four compressor controls, namely the aforementioned "quick cool-down control", three compressor controls as described below, "fuel-saving and power-saving control", "maximal dehumidification control", and "low-temperature DEMIST control". In Step S7121, in other words, a test is made to discriminate if the intake air temperature $T_{INT}$ is too close to the target intake air temperature $T'_{INT}$. If the answer to Step 7121 is in the negative (no), Step 7122 (S7122) proceeds in which the target discharge air temperature $T'_{INT}$ is incremented by a predetermined temperature $T_{10}$, for example 5° C. and then Step 7124 (S7124) proceeds in which the above mentioned solenoid current control as shown in FIGS. 8, 8A, and 8B is executed. If the answer to Step S7121 is in the affirmative (yes), Step 7123 (S7123) proceeds in which the target discharge air temperature $T'_{INT}$ is set to a predetermined temperature $T_{11}$, for example 20° C. which temperature $T_{11}$ is higher than the temperature $T_{10}$ and then Step S7124 proceeds. In this way, the solenoid 345 is operated according to the value of the solenoid current $I_{SOL1}$ calculated at Step S7124. After this, the procedure returns from Step S7124 to Step S80 of FIG. 5.

A negative answer at Step S7121 means that the intake air temperature $T_{INT}$ is excessively close to the target intake air temperature $T'_{INT}$. Therefore, in Step S7122, even though the target intake air temperature $T_{INT}$ is incremented by the relatively low temperature $T_{10}$, the value of the solenoid current $I_{SOL1}$ becomes higher. Due to this high solenoid current, the removable plate 344 moves upward and as a result the preset pressure Pr of the control valve 32 is increased. Therefore, since the state as shown in FIG. 2B at which the suction pressure Ps is equal to or lower than the preset pressure Pr, is satisfied even if the suction pressure Ps is relatively high, the small slope angle of the swash plate 25 of the compressor 2 is maintained. That is to say, the discharge of the compressor 2 is kept at a low level, thereby causing lower cooling power from the cooling unit 100.

On the other hand, a positive answer at Step S7121 means that the intake air temperature $T_{INT}$ is lower than the predetermined temperature $T_{INT1}$ but not in excessively close proximity to the target intake air temperature $T'_{INT}$. Therefore, in Step S7123, the target intake air temperature $T'_{INT}$ of the evaporator 4 is set to a higher temperature $T_{11}$ than the temperature $T_{10}$ such that acceleration performance is increased even if the cooling power is lowered. In this manner, the high solenoid current $I_{SOL1}$ is applied to the solenoid 345, and as a result the movable plate 344 moves upward, thereby causing increase in the preset pressure Pr of the control valve 32. Since the target intake air temperature $T'_{INT}$ in Step S7123 is set to a sufficiently high temperature $T_{11}$ than that in Step S7122 with the result that the preset pressure Pr in Step S7123 is set higher than that in Step S7122. Therefore, since the state as shown in FIG. 2B is satisfied even if the suction pressure Ps is high, the small slope angle of the swash plate 25 is kept. The predetermined temperature $T_{11}$ used at Step S7123 corresponds to the temperature of air flowing through the evaporator 4 as measured just behind the evaporator 4, under this particular condition the compressor 2 never stops but is driven with the minimum discharge.

In practice, the temperature $T_{11}$ is experimentally determined.

When the target intake air temperature $T'_{INT}$ is increased in Steps S7122 or S7123, the actual detected intake air temperature $T_{INT}$ gradually increases. Therefore, since the difference S between the target discharge air temperature $T_0$ and the actual discharge air temperature is changed, the air mixing door 11 is actuated to the closed position such that air flowing to the heater unit 10 is out of. As a result, the discharge air temperature is maintained at a substantially constant value even though the flow of refrigerant is decreased, that is, the discharge of the compressor 2 is small.

Figure 10:
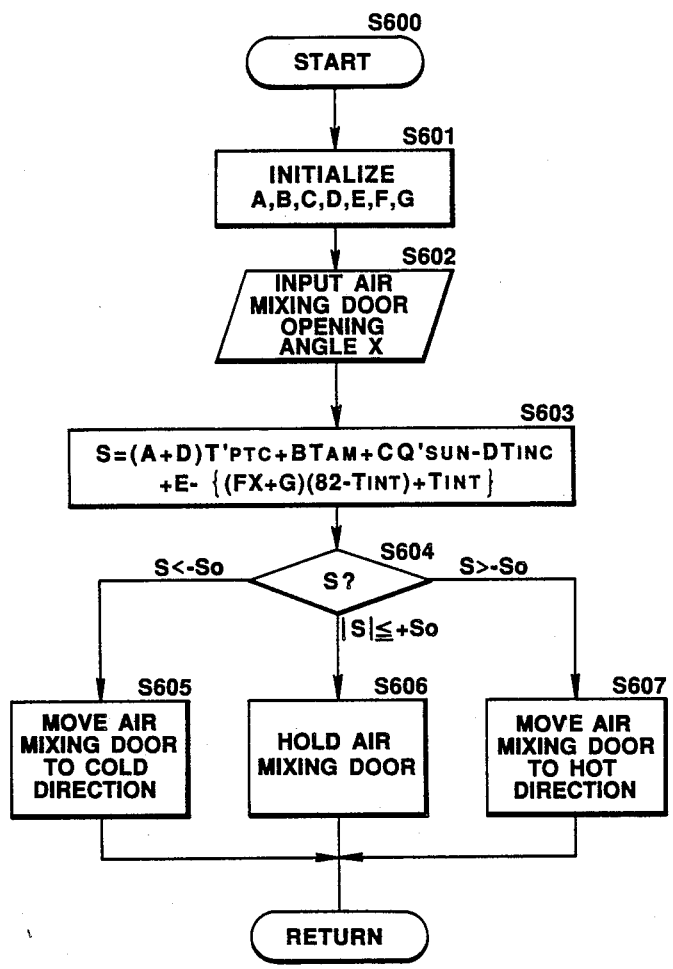
FIG. 10 is a flow chart representative of a program for controlling the opening angle of the air mixing door of an automatic air conditioning system according to the invention.

The opening angle of the air mixing door 11 is controlled in accordance with FIG. 10. The control routine of the opening angle of the air mixing door 11 begins at Step 600 (S600) and then at Step 601 (S601) a plurality of constants A, B, C, D, E, F, and G are respectively initialized to predetermined values as used for the equation of Step 603 (S603) in FIG. 10. These values A to G are experimentally determined in consideration of vehicular sizes or vehicular shapes.

In Step 602 (S602), a signal indicative of a present opening angle X of the air mixing door 11 is input from the air mixing door opening angle sensor 63.

Next, in Step 603 (S603), the difference S between the target discharge air temperature $T_0$ and the actual discharge air temperature is derived in accordance with the equation shown in Step S603. In this equation, the front term "$(A+D)T'_{PTC}+BT_{AM}+CQ'_{SUN}-DT_{INC}+E$" corresponds to the target discharge temperature $T_0$, while the rear term "$(FX+G)(82-T_{INT})+T_{INT}$" corresponds to the actual discharge air temperature. As will be appreciated from the equation, the target discharge air temperature $T_0$ is calculated on the basis of the above mentioned values $T'_{PTC}$, $T_{AM}$, $Q'_{SUN}$, and $T_{INT}$. Furthermore, the actual discharge air temperature is calculated on the basis of the intake air temperature $T_{INT}$ and the opening angle X of the air mixing door 11.

Subsequently, at Step 604 (S604), the difference S is compared with a predetermined value $S_0$, for instance 2° C. If the difference S is smaller than the value $-S_0$, Step 605 (S605) proceeds in which the air mixing door 11 is activated by the air mixing door actuator 51 to a closed direction in such a manner that the amount of air flowing through the heater unit 10 is decreased. The closed direction of the air mixing door 11 will be hereinafter referred to as a "cold direction". If the absolute value $|S|$ of the difference S is equal to or smaller than the value $+S_0$, Step 606 (S606) proceeds in which the opening angle of the air mixing door 11 is held as it is. If the difference S is larger than $-S_0$, Step 607 (S607) proceeds in which the air mixing door 11 is activated by the air mixing door actuator 51 to an open direction in such a manner that the amount of air flowing through the heater unit 10 is increased. The open direction of the air mixing door 11 will be hereinafter referred to as a "hot direction". In this manner, the air mixing door 11 is continuously controlled on the basis of the above-mentioned control parameters $T'_{PTC}$, $T_{AM}$, $Q'_{SUN}$, $T_{INC}$, $T_{INT}$, and X in accordance with the flow chart of FIG. 10.

As will be seen from FIG. 6, the "destroke control" of Step S712 is executed under a particular condition in which the engine 1 is driven at a higher output than the revolution $R_{rev2}$, for example 5,000 r.p.m. or the automotive vehicle is under acceleration.

The "destroke control" will be featured as follows:

In the "destroke control" under acceleration conditions of vehicle, is executed when the procedure shown in FIG. 6 advances from Step S710 via Step S711 to Step S712. Since the intake air temperature $T_{INT}$ is lower than the predetermined temperature $T_{INT1}$, for example 5° C., the task of the cooling unit 100 is considerably accomplished. Therefore, a feature of this "destroke control" is that the cooling power of the cooling unit 100 is lowered so as to smoothly accelerate the automotive vehicle. That is, the preset pressure Pr of the compressor 2 is set at a relatively high level with the result that torque absorbed by the compressor 2 is lowered. In this "destroke control" under acceleration conditions, if the intake air temperature $T_{INT}$ is in close proximity to the target intake air temperature $T'_{INT}$, and thus the cooling task of the evaporator 4 is fully accomplished, the preset pressure Pr of the control valve 32 is set to a relatively high pressure in such a manner to add the predetermined temperature $T_{10}$ to the target intake air pressure $T'_{INT}$ as shown in Step S7122 of FIG. 9. Therefore, the cooling power of the cooling unit 100 is lowered and as a result torque absorbed by the compressor 2 decreases. Thus, the acceleration performance of the automotive vehicle is increased.

On the other hand, if the intake air temperature $T_{INT}$ is not in close proximity to the target intake air temperature $T'_{INT}$ but the intake air temperature $T_{INT}$ is lower than the predetermined temperature $T_{INT1}$, and thus the cooling task of the cooling unit 100 is fully accomplished, the preset pressure Pr of the control valve 32 is set to a considerably higher pressure in such a manner to replace the predetermined temperature $T_{11}$ to the target intake air temperature $T'_{INT}$ as shown in Step S7123 of FIG. 9. Therefore, the cooling power of the cooling unit 100 is considerably lowered and as a result torque absorbed by the compressor 2 considerably decreases. Thus, the acceleration performance of the automotive vehicle is considerably increased. That is to say, when compared the "destroke control" executed through Step S7123 with the "destroke control" executed through Step S7122, the former (S7123) is different from the latter (S7122) at a point where the acceleration performance of the former exceeds that of the latter.

In the "destroke control" during a high-output state of the engine 1, which is executed when the procedure shown in FIG. 6 advances directly from Step S705 to Step S712, since the engine 1 is in the high revolution state, the compressor 2 is also driven through the pulley 23 by the belt 22 at a high speed. Therefore, a feature of this "destroke control" is that the compressor 2, when driven at a high speed, causes the plurality of pistons 28 to reciprocate with a relatively small stroke to prevent the durability of the compressor 2 from decreasing. That is, the slope angle of the swash plate 25 of the compressor 2 is set at a small value with the result that the life of the compressor 2 becomes long particularly due to a decrease in abrasion of the pistons.

Again, in FIG. 6, if the answer to Step S711 is in the negative (no), Step 713 (S713) proceeds in which a test is made to determine whether an air conditioner switch is in the On state. If the answer to Step S713 is in the affirmative (yes), the procedure jumps from Step S713 to Step 716 (S716). Conversely, if the answer to Step S713 is in the negative (no), Step 714 (S714) proceeds in which a test is made to determine whether the afore- mentioned ambient temperature $T_{AM}$ is in the third, fourth, or fifth states. If the answer to Step S714 is in the fourth or fifth states, the procedure jumps to Step S702 in which the compressor 2 is stopped. If the answer to step S714 is the third state, Step 715 (S715) proceeds in which the compressor 2 is so controlled as to save power thereof in order to avoid wasteful consumption of fuel. This control of the compressor 2 will be hereinafter referred to as a "fuel-saving and power-saving control".

The "fuel-saving and power-saving control" will be described in detail in accordance with a flow chart of FIG. 11.

This "fuel-saving and power-saving control" routine begins at Step 7150 (S7150) and then Step 7151 (S7151) proceeds in which a test is made to determine whether the air conditioning system is operated in BI-LEVEL mode wherein the chest vent door 12 and the foot vent door 13 are opened and the defroster door 14 is closed and the proportion between the respective amounts of air flowing through the chest vent 7c and the foot vent door 7d is substantially equal. If the answer to Step S7151 is in the affirmative (yes), Step 7152 (S7152) proceeds in which the target intake air temperature $T'_{INT}$ is derived on the basis of the target discharge air temperature $T_0$ in accordance with a lower graph II having a second characteristic as shown in FIG. 11A. If the answer to Step S7151 is in the negative (no), Step 7153 (S7153) proceeds in which the target intake air temperature $T'_{INT}$ is derived on the basis of the target discharge air temperature $T_0$ in accordance with an upper graph I having a first characteristic as shown in FIG. 11A.

In Step 7154 (S7154), a test is made to discriminate whether the intake air temperature $T_{INT}$ is in a sixth state or a seventh state according to a state transition graph of Step S7154. In the state transition graph of Step S7154, the difference in temperature between a predetermined temperature $T_6$, for example 1.5° C. and the "freezing start possible temperature" $T_4$ corresponds to a hysteresis which is provided for preventing the compressor 2 from frequently starting or switching OFF.

In Step 7155 (S7155), a test is made to determine whether the temperature $T_{INT}$ is in the seventh state. If the answer to Step S7155 is in the affirmative, that is, the seventh state, Step 7157 (S7157) proceeds in which the compressor 2 is stopped. On the other hand, if the answer to Step S7155 is in the negative, that is, the sixth state, Step 7156 (S7156) proceeds in which the aforementioned control of the solenoid current $I_{SOL1}$ is executed according to FIG. 8. After this, the procedure returns from Steps S7156 or S7157 to Step S80 of FIG. 5.

In FIG. 11A, the respective temperatures denoted by reference numerals $T_7$, $T_{01}$, $T_{02}$, $T_{03}$, and $T_{04}$ are experimentally determined depending upon the various sizes and/or types of automotive vehicles. For example, these temperatures $T_7$, $T_{01}$, $T_{02}$, $T_{03}$, and $T_{04}$ may be 15° C., 8° C., 18° C., 20° C. and 30° C., respectively.

As will be clearly seen from FIG. 11A, the target intake air temperature $T'_{INT}$ is set on the basis of the target discharge air temperature $T_0$, thereby allowing the compressor a fine degree of control.

As is well known, since prior art automatic air conditioning systems conventionally control an opening angle of an air mixing door on the basis of the difference between an actual intake air temperature $T_{INT}$ and a target discharge air temperature $T_0$ for providing a desired discharge air temperature, the intake air temperature $T_{INT}$ becomes undesirably lower due to fluctuation of engine speed. Under this condition, conventional automotive air conditioning systems control the air mixing door to its open or hot direction with the result that the discharge air temperature reaches the target discharge air temperature. In this system, the compressor consumes more torque than desired, thereby causing wasteful fuel consumption.

On the other hand, in the present embodiment according to the invention, the air conditioning system controls the compressor 2 in such a manner that the discharge of the compressor 2 is finely controlled on the basis of the target intake air temperature $T'_{INT}$ finely selected according to two graphs shown in FIG. 11A. As a result, the intake air temperature $T_{INT}$ is controlled by regulating the discharge of the compressor 2. Therefore, in the automatic air conditioning system of the present invention, the intake air temperature $T_{INT}$ does not become lower than the desired intake air temperature, unlike prior art automatic air conditioning systems. That is to say, to avoid the undesirable lowering of the intake air temperature $T_{INT}$, the present automatic air conditioning system selects the target intake air temperature $T'_{INT}$ on the basis of the temperature relationship between the target intake air temperature $T'_{INT}$ and the target discharge temperature $T_0$ whose relationship has been experimentally determined and then determines the solenoid current $I_{SOL1}$ in accordance with the procedure of FIG. 8. In this manner, the compressor 2 is driven at minimum requirements, thereby allowing the compressor 2 to save power thereof in order to avoid wasteful consumption of fuel.

In the "fuel-saving and power-saving control" of the embodiment according to the invention, since the compressor 2 is driven at minimum requirements, the intake air temperature $T_{INT}$ of the evaporator 4 tends to be in close proximity to the target discharge air temperature $T_0$. For this reason, the air mixing door 11 tends to be operated in the fully closed or cold position wherein a flow passage for the heater unit 10 is fully closed and the air flowing through the evaporator 4 does not enter into the heater unit 10 at all. Under this condition, if the air conditioning system is operated in the BI-LEVEL mode, the discharge air temperature of the foot vent 7d is substantially equal to that of the chest vent 7c. The reason for this is that the air mixing door is fully closed. Therefore, conditioned air having essentially same temperature is discharged from both vents in spite of the conventional arrangement of the automotive air conditioner system, in which the foot vent is arranged nearer the heater unit than other discharge outlets, such as the chest vent, and the defroster nozzle. As is well known, the BI-LEVEL mode is an operating condition where the discharge air temperature of the foot vent is higher than that of the chest vent. As set forth above, in the "fuel-saving and power-saving control", the BI-LEVEL mode is not sufficiently satisfied. Therefore, the "fuel-saving and power-saving control" of the preferred embodiment provides the two graphs I and II having respectively the first and second characteristics as shown in FIG. 11A. As clearly seen in the lower graph of FIG. 11A, in BI-LEVEL mode, the intake air temperature $T_{INT}$ relative to the identical target discharge air temperature $T_0$ is set to a lower value than another modes except the BI-LEVEL mode with the result that the discharge air temperature of the foot vent is higher than that of the chest vent and thus the BI-LEVEL mode is satisfied. While, using the "fuel-saving and power-saving control" during BI-LEVEL operation, the fuel and power-saving effect becomes slightly lowered.

That is to say, when comparing the "fuel-saving and power-saving control" function during the BI-LEVEL mode with same during modes other than the BI-LEVEL mode, the solenoid current $I_{SOL1}$ of the former is set to a lower value than that of the latter on the basis of the respective target intake air temperatures $T'_{INT}$ relative to the identical target discharge air temperature $T_0$, thereby allowing the target intake air temperature $T'_{INT}$ of the former to be assigned a lower value than in the latter operation. As a result, the air mixing door 11 moves to the hot direction slightly. In this way, during the BI-LEVEL mode, the "fuel-saving and power-saving control" is executed.

On the other hand, in FIG. 6, if the answer to Step S707 is in the affirmative (the defroster switch 60 is in an On state), Step 716 (S716) proceeds in which a test is made to determine whether the state of the ambient temperature $T_{AM}$ stored in Step S706 is in the third, fourth, or fifth states. If the ambient temperature $T_{AM}$ is in the third state, Step 717 (S717) proceeds in which a dehumidification control as shown in detail in FIG. 12, which control will be hereinafter referred to as a "maximal dehumidification control", is executed as follows.

The "maximal dehumidification control" begins at Step 7170 (S7170), and then Step 7171 (S7171) proceeds in which the target intake air temperature $T_{INT}$ is set to the "freezing start possible temperature" $T_4$, for example 3° C.

Figure 11:
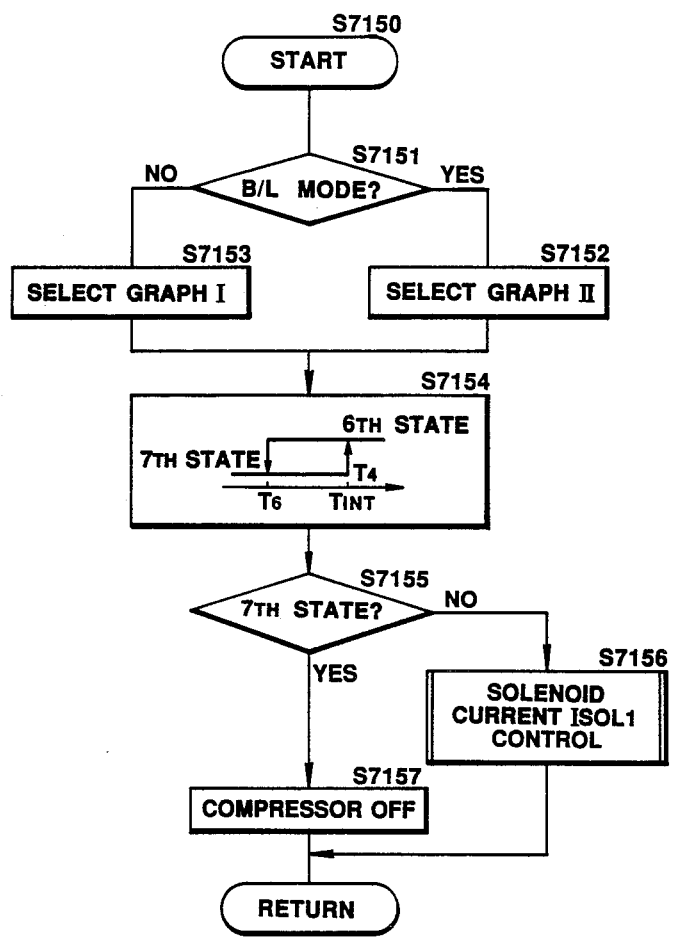
FIG. 11 is a flow chart representative of a program for controlling the compressor of the invention under fuel-saving and power-saving conditions.
Figure 11A:
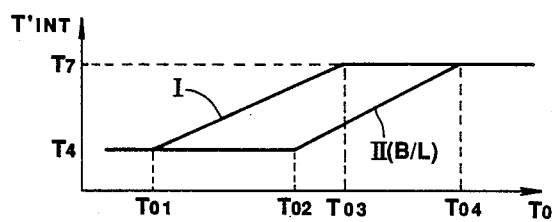
FIG. 11A is two graphs for deriving a target intake air temperature from a target discharge air temperature, the graphs are associated with Steps S7152 and S7153.
Figure 12:
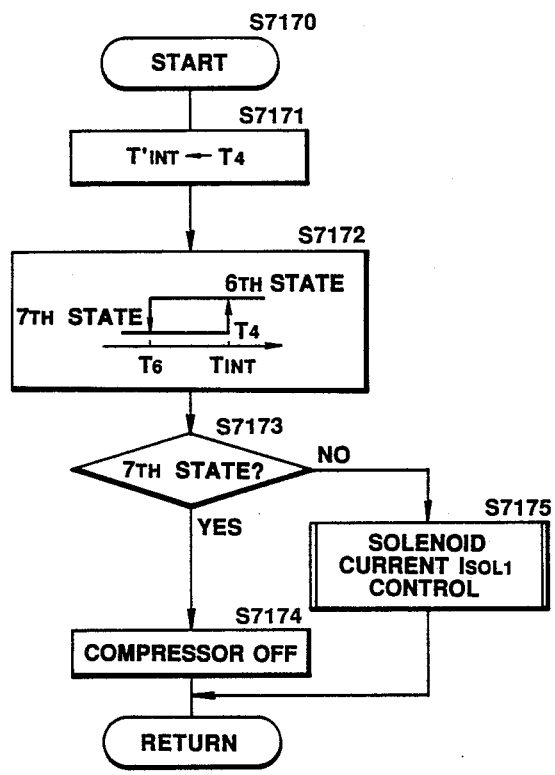
FIG. 12 is a flow chart representative of a program for controlling the compressor under maximal dehumidification conditions.

In Step 7172 (S7172), a test is made to discriminate whether the intake air temperature $T_{INT}$ is in the sixth state or the seventh state, both states being shown in Step S7154 of FIG. 11.

In Step 7173 (S7173), a test is made to determine whether the intake air temperature $T_{INT}$ is in the seventh state. If the answer to Step S7173 is in the affirmative, Step 7174 (S7174) proceeds in which the compressor 2 is stopped. Conversely, if the answer to Step S7173 is in the negative, Step 7175 (S7175) proceeds in which the solenoid current $I_{SOL1}$ is controlled according to FIG. 8 as set forth above. After this, the procedure returns from Steps S7174 or S7175, to Step S80 of FIG. 5.

On the other hand, in Step S716 of FIG. 6, if the ambient temperature $T_{AM}$ is in the fourth state, Step 718 (S718) proceeds in which the air conditioning system is operated in DEMIST mode wherein the foot vent door 13 and the defroster door 14 are opened and the chest vent door 12 is closed. During the DEMIST mode the compressor is controlled in accordance with the routine shown in FIG. 13. This compressor control will be hereinafter referred to as a "low-temperature DEMIST control" because the control is effective under conditions of relatively low ambient temperature, that is, at the ambient temperature of the fourth state shown at Step S706 of FIG. 6. In the "low-temperature DEMIST control" mode, the compressor 2 is positively driven so as to provide high dehumidification under high humidity and relatively low ambient temperature, such as a rainy spell, in autumn or other high humidity conditions. As set forth, in this "low-temperature DEMIST control", frost tends to occur on the evaporator 4, thereby causing lowered efficiency of thermal exchange between the air flowing through the evaporator 4 and the refrigerant flowing in evaporator 4. Under this condition, if the compressor is driven for a long time, the refrigerant is not sufficiently evaporated, but a part of the refrigerant is liquefied, thereby causing damage to the compressor 2. Due to the frost adhering to the evaporator 4, the compressor 2 cannot be sufficiently controlled by the intake air temperature $T_{INT}$ of the evaporator 4. Therefore, during the "low-temperature DEMIST control", the refrigerant temperature $T_{ref}$ and a target refrigerant temperature $T'_{ref}$ are applied as control parameters for the compressor control. The "low-temperature DEMIST control" begins at Step 7180 (S7180) and then Step 7181 (S7181) proceeds in which a first target refrigerant temperature $T'_{ref1}$ is set to $T_{AM}+T_8$ (the ambient temperature $T_{AM}$ plus a predetermined temperature $T_8$, for example 16° C.) and a second target refrigerant temperature $T'_{ref2}$ is set to $T_{AM}-T_9$ (the ambient temperature $T_{AM}$ minus a predetermined temperature $T_9$, for example 4° C.) and further in which timers TIMER2 and TIMER3 are set to a predetermined times $t_2$, for example 3 minutes and $t_3$, for example 2 minutes respectively.

Figure 14:
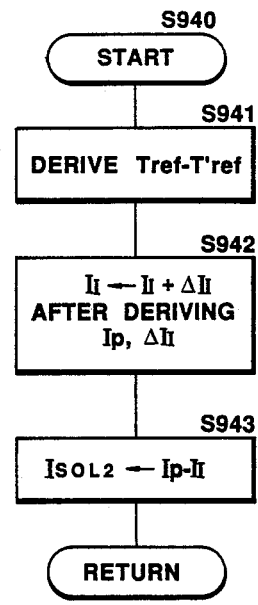
FIG. 14 is a flow chart representative of a program for controlling the solenoid current during the low-temperature DEMIST mode so as to change the preset pressure of the control valve of the compressor according to the invention.
Figure 14B:
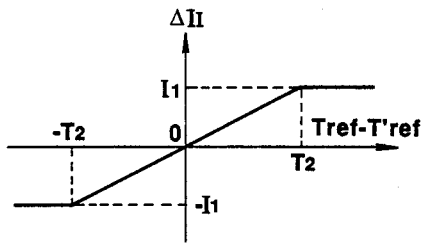
FIGS. 14A and 14B are graphs used for deriving the solenoid current on the basis of the difference between a refrigerant temperature and a target refrigerant temperature.
Figure 14A:
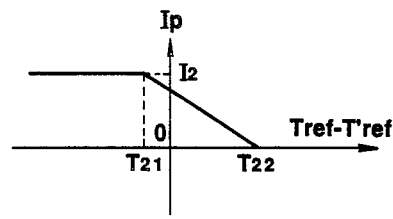

In Step 7182 (S7182), a test is made to determine whether a flag 1 in the CPU is "0". If the answer to Step S7182 is in the affirmative, Step 7183 (S7183) proceeds in which a test is made to determine whether a flag 2 in the CPU is "0". If the answer to Step S7183 is in the affirmative, Step 7184 (S7184) proceeds in which the timer TIMER2 starts and then Step 7185 (S7185) proceeds in which the second target refrigerant temperature $T_{ref2}$ is selected as a target refrigerant temperature $T'_{ref}$. Subsequently, in Step 7186 (S7186), the solenoid current $I_{SOL2}$ control is executed according to the procedure of FIG. 14. This procedure of the solenoid current $I_{SOL2}$ control is similar to that of the solenoid current $I_{SOL1}$ control shown in FIG. 8. The former is different from the latter in a point that the temperatures $T_{INT}$ and $T'_{INT}$ are replaced with the temperatures $T_{ref}$ and $T'_{ref}$, respectively. That is to say, in the solenoid current $I_{SOL2}$ control, the solenoid current $I_{SOL2}$ is derived on the basis of the refrigerant temperature $T_{ref}$ and the target refrigerant temperature $T'_{ref}$. As set forth above, since the procedure of the solenoid current $I_{SOL2}$ control is similar to that of the solenoid current $I_{SOL1}$ control, a description has been omitted for the purpose of the simplification of the disclosure. Likewise, in FIGS. 14A and 14B, the values of current $I_1$ and $I_2$, and the values of temperature $T_2$, $T_{21}$, and $T_{22}$ are respectively, for example 0.98 mA, 0.8 A, 6° C., −5° C. and 15° C. and these values are experimentally determined so as to suitably operate the solenoid 345.

Subsequently, in Step 7187 (S7187), a test is made to determine whether the preset time $t_2$ of the timer TIMER2 has elapsed. If the answer to Step S7187 is in the negative, Step 7194 (S7194) proceeds in which the flag 1 is set to "1" and the routine returns to the predetermined procedure. If the answer to Step S7187 is in the affirmative, Step 7188 (S7188) proceeds in which the flag 1 is set to "0" and then Step 7189 (S7189) proceeds in which the timer TIMER3 starts. Next, in Step 7190 (S7190), the target refrigerant temperature $T'_{ref1}$ is selected as the target refrigerant temperature $T'_{ref}$ and then Step 7191 (S7191) proceeds in which the solenoid current $I_{SOL2}$ control is executed as it is at Step S7186. Furthermore, in Step 7192 (S7192), a test is made to determine whether the preset time $t_3$ of the timer TIMER3 has elapsed. If the answer to Step S7192 is in the negative, Step 7195 (S7195) proceeds in which the flag 2 is set to "1" and then the routine returns to the predetermined procedure. If the answer to Step 7192 is in the affirmative, Step 7193 (S7193) proceeds in which the flag 2 is set to "0" and then the routine returns to the predetermined procedure. That is to say, the procedure returns from Steps S7193, S7194, or S7195 to Step 80 of FIG. 5.

Figure 13A:
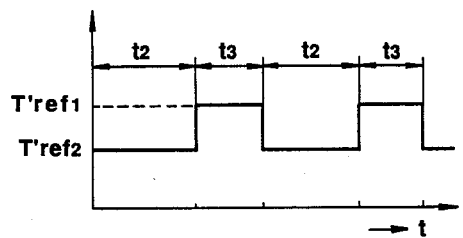
FIG. 13A is a graph illustrating the relationship between two target refrigerant temperatures and two preset times for causing pulsation of the compressor during the low-temperature DEMIST mode shown in FIG. 13.

As will be clearly seen from FIG. 13A, when the procedure of the "low-temperature DEMIST control" is executed, the target refrigerant temperatures $T'_{ref2}$ and $T'_{ref1}$ are selected by turns in accordance with the elapse of the predetermined times $t_2$ and $t_3$. The elapse of the predetermined time $t_2$ corresponds to Steps S7184 to S7187, while the elapse of the predetermined time $t_3$ corresponds to Steps S7189 to S7192. Therefore, the solenoid current $I_{SOL2}$ is also changed in response to change in the target refrigerant temperature $T'_{ref}$, thereby causing the pulsation of the compressor 2. In this manner, even if the flow of refrigerant is small, the lubricating ability of the compressor 2 is increased, thereby preventing the compressor 2 from seizing. Furthermore, by the suitable selection of the preset times $t_2$ and $t_3$, dry air with a relatively low temperature is discharged through the foot vent 7d and the defroster nozzle 7e to the passenger's feet and the inner surface of the front window. In this way, the suitable dehumidification is accomplished.

Moreover, in Step S716 of FIG. 6, the ambient temperature $T_{AM}$ is in the fifth state, Step 719 (S719) proceeds in which the compressor 2 is stopped and then the procedure returns to Step 80 of FIG. 5.

As will be appreciated from the above, although in the present embodiment according to the invention, a swash-plate type of compressor is used for a variable displacement compressor, an inclined shaft type of compressor may be used as a variable displacement compressor.

Although a requirement of the "quick cool-down control" according to the embodiment is such that the target discharge air temperature $T_0$ is lower than the predetermined temperature $T_{rcd}$, this requirement may be determined on the basis of the room temperature $T_{INC}$ or the ambient temperature $T_{AMB}$. Furthermore, the requirement of the "quick cool-down control" may be executed by a request switch provided in a vehicular cabin through which a passenger can enter a "quick cool-down control" command.

Although, to avoid freezing of an evaporator, the discharge of a variable displacement compressor is controlled in such a manner that, when the suction pressure of the compressor exceeds the preset pressure, the discharge of the compressor is increased, and conversely when the suction pressure of the compressor is lower than the preset pressure, the discharge of the compressor is decreased, the discharge of the compressor may be controlled by comparing the refrigerant temperature with a preset refrigerant temperature as described in the above mentioned "low-temperature DEMIST control".

Furthermore, in the preferred embodiment, the "quick cool-down control" is so set as to engage until the target discharge air temperature $T_0$ is higher than the temperature $T_5$ or until the preset time $t_1$ elapses from a time when the intake air temperature $T_{INT}$ has decreased to the temperature $T_4$ after setting the target intake air temperature $T'_{INT}$ to the predetermined temperature $T_1$. These predetermined values $T_1$, $T_5$, and $t_1$ may not be constant but may be changed to the limit of freezing of the automatic air conditioning system. For example, if the ambient temperature $T_{AMB}$ is excessively high, the value $t_1$ may be set longer, or the value $T_1$ may be set lower.

While the foregoing is a description of the best mode for carrying out the invention, it will be understood that the invention is not limited to the particular embodiments shown and described herein, but may include variations and modifications without departing from the scope or spirit of this invention as defined by the following claims.

What is claimed is:

1. An automatic air conditioning system for automotive vehicles with a variable displacement compressor comprising:
    first detecting means for detecting a first physical quantity indicative of a cooling condition of an evaporator of said automatic air conditioning system;
    discharge changing means for essentially changing the discharge of said compressor on the basis of the difference between said first physical quantity and its preset value;
    first signal generating means for generating a first signal in response to a requirement for quick-cooling; and
    preset value changing means for changing said preset value of said first physical quantity in such a manner that, when said preset value changing means does not receive said first signal, said preset value is set to a first value at which an intake air temperature, defined by the temperature of air flowing through said evaporator as measured just behind said evaporator, reaches a freezing start possible temperature, an intake air temperature such that the freezing of said evaporator starts, and when said preset value changing means receives said first signal, said preset value is set to a second value at which said intake air temperature reaches a predetermined temperature lower than said freezing start possible temperature.

2. An automatic air conditioning system for automotive vehicles as set forth in claim 1, wherein said discharge changing means operates in such a manner that, when said first physical quantity exceeds said preset value, the discharge volume is essentially increased, and when said first physical quantity is lower than said preset value, the discharge volume is essentially decreased.

3. An automatic air conditioning system for automotive vehicles as set forth in claim 1, wherein said first physical quantity is said intake air temperature, a suction pressure of said compressor, or a refrigerant temperature.

4. An automatic air conditioning system for automotive vehicles as set forth in claim 1, further comprising:
    second detecting means for detecting a second physical quantity indicative of environmental conditions in and around said automotive vehicle; and
    said first signal generating means generating said first signal when it is determined that the thermal load flowing through said evaporator exceeds a predetermined value on the basis of said second physical quantity.

5. An automatic air conditioning system for automotive vehicles as set forth in claim 4, wherein said second physical quantity is ambient temperature, magnitude of insolation, and/or room temperature in the vehicular cabin.

6. An automatic air conditioning system for automotive vehicles as set forth in claim 4, wherein said first signal generating means generates said first signal when a target discharge air temperature of air to be discharged from a discharge outlet, calculated on the basis of said second physical quantity and a desired temperature input by temperature setting means for setting a desirable room temperature in the vehicular cabin, is lower than a predetermined temperature.

7. An automatic air conditioning system for automotive vehicles as set forth in claim 4, wherein said first signal generating means generates said first signal when said room temperature exceeds a predetermined temperature.

8. An automatic air conditioning system for automotive vehicles as set forth in claim 1, wherein said preset value changing means maintains said preset value to said second value until a preset time elapses from a point of time when said intake air temperature has reached said freezing start possible temperature or until it is determined that room temperature in the vehicular cabin decreases and has reached a predetermined temperature.

9. An automatic air conditioning system for automotive vehicles as set forth in claim 8, wherein said preset value changing means determines that said room temperature has reached said predetermined temperature when said target discharge air temperature exceeds a predetermined temperature.

10. An automatic air conditioning system for automotive vehicles as set forth in claim 8, wherein said preset time is suitably selected depending on a level of said ambient temperature or said room temperature.

11. An automatic air conditioning system for automotive vehicles as set forth in claim 1, further comprising:
    a manually operated switch for outputting a signal indicative of said requirement for quick-cooling.

12. An automatic air conditioning system for automotive vehicles with a variable displacement compressor, said compressor being operated in such a manner that, when the suction pressure of said compressor exceeds a preset pressure, the discharge of said compressor is increased, and when said suction pressure is equal to or is lower than said preset pressure, said discharge is decreased, comprising:
    first detecting means for detecting a first physical quantity which is indicative of a cooling condition of an evaporator of said automatic air conditioning system;
    first signal generating means for generating a first signal indicative of a requirement for quick-cooling;
    second signal generating means for generating a second signal indicative of the difference between said first physical quantity and its preset value;
    preset pressure changing means for changing said preset pressure in response to said second signal; and
    preset value changing means for changing said preset value of said first physical quantity in such a manner that, when said preset value changing means does not receive said first signal, the preset value is set to a first value at which an intake air temperature, defined by the temperature of air flowing through said evaporator as measured just behind said evaporator, reaches a freezing start possible temperature, an intake air temperature such that the freezing of said evaporator starts, and when said preset value changing means receives said second signal, the preset value of said first physical quantity is set to a second value at which said intake air temperature reaches a predetermined temperature lower than said freezing start possible temperature.

13. An automatic air conditioning system for automotive vehicles as set forth in claim 12, wherein said first physical quantity is said intake air temperature or a refrigerant temperature.

14. An automatic air conditioning system for automotive vehicles as set forth in claim 12, further comprising:
 second detecting means for detecting a second physical quantity indicative of environmental condition in and around said automotive vehicle;
 said first signal generating means generating said first signal when it is determined that the thermal load flowing through said evaporator exceeds a predetermined value on the basis of said second physical quantity.

15. An automatic air conditioning system for automotive vehicles as set forth in claim 14, wherein said second physical quantity is ambient temperature, magnitude of insolation, and/or room temperature in the vehicular cabin.

16. An automatic air conditioning system for automotive vehicles as set forth in claim 14, wherein said first signal generating means generates said first signal when a target discharge air temperature, to be discharged from a discharge outlet, calculated on the basis of said second physical quantity and a desired temperature input by a temperature setting means for setting a desirable room temperature in the vehicular cabin, is lower than a predetermined temperature.

17. An automatic air conditioning system for automotive vehicles as set forth in claim 14, wherein said first signal generating means generates said first signal when said room temperature exceeds a predetermined temperature.

18. An automatic air conditioning system for automotive vehicles as set forth in claim 12, wherein said preset value changing means maintains said preset value to said second value until a preset time elapses from a point of time when said intake air temperature has reached said freezing start possible temperature or until it is determined that room temperature in the vehicular cabin decreases and has reached a predetermined temperature.

19. An automatic air conditioning system for automotive vehicles as set forth in claim 18, wherein said preset value changing means determines that said room temperature has reached said predetermined temperature when said target discharge air temperature exceeds a predetermined temperature.

20. An automatic air conditioning system for automotive vehicles as set forth in claim 18, wherein said preset time is suitably selected depending on a level of said ambient temperature or said room temperature.

21. An automatic air conditioning system for automotive vehicles as set forth in claim 12, further comprising:
 a manually operated switch for outputting a signal indicative of said requirement for quick-cooling.

22. A variable displacement compressor used for an automatic air conditioning system for automotive vehicles, said compressor being operated in such a manner that, when the suction pressure of said compressor exceeds a preset pressure, the discharge of said compressor is increased, and when said suction pressure is equal to or is lower than said preset pressure, said discharge is decreased, comprising:
 preset pressure changing means capable of changing said preset pressure, said preset pressure changing means operating in such a manner that, when said preset value changing means does not receive a signal indicative of a requirement for quick-cooling from a control unit of said automatic air conditioning system, said preset pressure is set to a first pressure at which an intake air temperature defined by a temperature of air flowing through an evaporator of said automatic air conditioning system as measured just behind said evaporator, reaches a freezing start possible temperature, an intake air temperature such that the freezing of said evaporator starts, and when said preset value changing means receives said signal indicative of a requirement for quick-cooling, the preset pressure is set to a second pressure at which said intake air temperature reaches a predetermined temperature lower than said freezing start possible temperature.

23. An automatic air conditioning system for automotive vehicles with a variable displacement compressor comprising:
 discharge means for compressing and discharging refrigerant;
 first detecting means for detecting a first physical quantity which is indicative of a cooling condition of an evaporator of said automatic air conditioning system;
 discharge changing means for changing discharge of refrigerant in such a manner that, when said first physical quantity exceeds a preset value, the discharge of said discharge means is essentially increased, and when said first physical quantity is equal to or is lower than said preset value, said discharge is essentially decreased;
 first signal generating means for generating a first signal indicative of a requirement for quick-cooling; and
 preset value changing means for changing said preset value of said first physical quantity in such a manner that, when said preset value changing means does not receive said first signal, the preset value of said first physical quantity is set to a first value at which an intake air temperature defined by said intake air temperature of air flowing through said evaporator just behind said evaporator reaches to a freezing start possible temperature defined by said intake air temperature such that the freezing of said evaporator starts, and when said preset value changing means receives said first signal, the preset value of said first physical quantity is set to a second value at which said intake air temperature reaches to a predeterminend temperature lower than said freezing start possible temperature.

24. An automatic air conditioning system for automotive vehicles as set forth in claim 23, wherein said first physical quantity is said intake air temperature, said suction pressure, or a refrigerant temperature.

25. An automatic air conditioning system for automotive vehicles as set forth in claim 23, further comprising:
 second detecting means for detecting a second physical quantity indicative of environmental conditons in and around said automotive vehicle; and
 said first signal generating means generates said first signal when it is determined that the thermal load to said evaporator exceeds a predetermined value on the basis of said second physical quantity.

26. An automatic air conditioning system for automotive vehicles as set forth in claim 25, wherein said second physical quantity is ambient temperature, magnitude of insolation, and/or room temperature in the vehicular cabin.

27. An automatic air conditioning system for automotive vehicles as set forth in claim 25, wherein said first signal generating means generates said first signal when a target discharge air temperature, to be discharged from a discharge outlet, which is calculated on the basis of said second physical quantity and a desired temperature input by temperature setting means for setting a desirable room temperature in the vehicular cabin, is lower than a predetermined temperature.

28. An automatic air conditioning system for automotive vehicles as set forth in claim 25, wherein said first signal generating means generates said first signal when said room temperature exceeds a predetermined temperature.

29. An automatic air conditioning system for automotive vehicles as set forth in claim 23, wherein said preset value changing means maintains said preset value to said second value until a preset time elapses from a point of time when said intake air temperature has reached said freezing start possible temperature or until it is determined that room temperature in the vehicular cabin decreases and has reached a predetermined temperature.

30. An automatic air conditioning system for automotive vehicles as set forth in claim 29, wherein said preset value changing means determines that said room temperature has reached said predetermined temperature when said target discharge air temperature exceeds a predetermined temperature.

31. An automatic air conditioning system for automotive vehicles as set forth in claim 29, wherein said preset time is suitably selected depending on a level of said ambient temperature or said room temperature.

32. An automatic air conditioning system for automotive vehicles as set forth in claim 23, further comprising;
a manually operated switch for outputting a signal indicative of said requirement for quick-cooling.

* * * * *